United States Patent

Richman

[15] 3,641,420

[45] Feb. 8, 1972

[54] HARMONIC-INSENSITIVE AC-TO-DC CONVERTER

[72] Inventor: Peter L. Richman, 22 Barberry Road, Lexington, Mass. 02173

[22] Filed: Mar. 12, 1970

[21] Appl. No.: 19,079

Related U.S. Application Data

[63] Continuation of Ser. No. 743,442, July 9, 1968.

[52] U.S. Cl. ....................321/9
[51] Int. Cl. ....................H02m 1/12
[58] Field of Search ....................321/9, 10, 41; 324/119, 128

[56] References Cited

UNITED STATES PATENTS

| | | | |
|---|---|---|---|
| 3,193,753 | 7/1965 | Fleming | 321/47 X |
| 3,466,525 | 9/1969 | Ainsworth | 321/47 X |
| 3,462,671 | 8/1969 | Lawn | 321/47 X |
| 3,504,265 | 3/1970 | Toulemonde | 321/5 |

*Primary Examiner*—William M. Shoop, Jr.
*Attorney*—Robert J. Schiller

[57] ABSTRACT

A system for converting a time-varying periodic, complex electrical input wave to DC with reduced response to selected harmonic distortion components of the wave, the system including a conventional AC–DC converter and means for selectively altering the gain of the converter between predetermined phase angles with respect to the fundamental of the wave. Gain alteration is typically effected by a second AC–DC converter having a different characteristic sensitivity to the distortion components than the first converter. The outputs of the two converters are scaled and then summed, the scaling factors being dependent on the harmonics the effect of which is intended to be reduced. One converter is an average-sensing device, the other being a peak-To-peak or peak-averaging sensing device.

26 Claims, 19 Drawing Figures

INVENTOR

Peter L. Richman

INVENTOR

Peter L. Richman

INVENTOR

Peter L. Richman

INVENTOR

Peter L. Richman

INVENTOR

Peter L. Richman

INVENTOR

Peter L. Richman

INVENTOR

Peter L. Richman

INVENTOR

Peter L. Richman

INVENTOR

Peter L. Richman

INVENTOR

Peter L. Richman

INVENTOR
Peter L. Richman

HARMONIC-INSENSITIVE AC-TO-DC CONVERTER

This application is a continuation of application Ser. No. 743,442 filed July 9, 1968 by Peter L. Richman and entitled, "Harmonic Insensitive AC to DC Converter."

This invention relates generally to a system for converting the magnitude of a time-varying input signal into a proportional DC signal which can then be measured by one of many commercially available DC measuring instruments. More particularly, this invention relates to a system of the specified type, wherein the conversion is of a time-varying periodic input signal, and is relatively insensitive to harmonically related distortion frequency components which are in the input signal in addition to the basic or fundamental sinusoidal waveform component. The invention is directly applicable, in particular, to situations in which the desired DC output is to be proportional to the absolute average value of the periodic, time-varying input signal, and in which the periodic, time-varying input signal exhibits two crossings of the zero-voltage axis for each period of the fundamental input wave component.

Known prior art systems which are used to convert the absolute average (typically abbreviated "average" by those skilled in the art) value of the time-varying periodic input signal into a DC output signal having a magnitude that is proportional to the input signal, usually utilize either vacuum-tube or semiconductor diodes or rectifiers, either by themselves or within a feedback loop, to obtain the required absolute value and averaging functions. A low-pass filter is used to eliminate remaining ripple components of the original time-varying periodic input signal from the output DC signal which results from the diode-operated absoluting and averaging circuits. Such converter systems are sometimes referred to by those working in the art as Average-to-DC Converters, the absolute property of the conversion being implied, since the average value of an AC signal—on a nonabsolute basis—is zero by definition.

Such Average-to-DC Converters find application and use as signal conditioning input converters for DC digital voltmeters, differential (or potentiometric) voltmeters, multimeters and in virtually all other AC average-measuring metering instruments. In many applications the absoluting function takes the form of discarding one-half (either the portion below or that above the zero voltage axis), of the input waveform, in which case the Average-to-DC conversion is said to be half-wave in nature, since the value of only half of the waveform (the positive half or the negative half respectively) is averaged and measured via the low-pass filter and measuring means which follow. In other cases, the polarity of one-half (either that lying below or that lying above the zero voltage axis) of the input time-varying periodic waveform is actually inverted, and added to the remaining half of the original waveform. This technique provides two half-waveforms, both of the same polarity, as inputs (either separately or combined into a single input) to the low-pass filter. In the latter case, the Average-to-DC conversion is said to be full wave in nature, since both halves of the waveform are used in the conversion.

In such prior art Average-to-DC converter systems, high accuracies are obtainable for the Average-to-DC conversion—that is, good stability and linearity of output DC with respect to input AC—for periodic, time-varying input signals that are essentially pure sine waves, virtually uncontaminated by distortion components which are harmonically related to the basic or fundamental input sinusoidal wave. In such circumstances, the output DC from the Average-to-DC converter accurately represents the average value of the periodic, time-varying input AC. However, what is usually desired in most practical applications for such AC-to-DC converters is a measurement not of the average, but rather of the R.M.S. or root-mean-square value of the time-varying, periodic AC input wave. The R.M.S. value is generally preferred because it is highly unresponsive to harmonic contamination or distortion on the AC wave, for small to moderate amounts of distortion, while the average value is not. The R.M.S. value is a more basic measurement, for which independent AC/DC transfer standards exist at national and industrial standardizing laboratories. Thus while a prior art Average-to-DC converter will also accurately convert the average value of a periodic wave which has harmonic contamination into a proportional DC representation for measurement by one of a number of conventional DC measuring instruments, it is the R.M.S. value or even the fundamental value (i.e., the value of the fundamental or basic waveform component alone, uncontaminated by harmonics) that is desired in most practical situations.

One way that is used to circumvent the problem in prior art systems is to use AC-to-DC converters that are inherently responsive to the R.M.S. value of the input wave, instead of to the average value. Such R.M.S. converters as they are called, are typically based on the operation of thermally sensitive devices such as thermocouples or thermistors, since the R.M.S. value of a wave is essentially a measure of its heating effect. Such devices tend to be inaccurate, slow, sensitive to overload (resulting in burnout or destruction of the thermally sensitive element), and unstable both with time and with ambient temperature changes.

Another way that is used to circumvent the problem of Average-to-DC converter harmonic sensitivity in the prior art is to precede the converter by a band-pass filter, tuned to the fundamental of the input wave. Thus, an output DC proportional to the average value of the fundamental wave component of the input AC is obtained at the output of the Average-to-DC converter, since the converter's input is only that wave which passes through the tuned filter, namely the basic or fundamental component of the input AC. This approach, however, has major disadvantages which severely limit its application. First, the filter restricts operation to a single input frequency or narrow band of frequencies, and must be changed for each new input frequency. Often, too, the input frequency cannot even be predicted with high accuracy, as in general purpose industrial applications. In addition, filter insertion loss tends to be unstable both with time and with changes in ambient temperature, making it difficult to obtain and maintain high accuracies in such a system in a practical implementation.

The present invention therefore has as a principal object, the provision of a high-precision AC-to-DC conversion device adapted to provide a DC output which exhibits a high degree of insensitivity to input wave components which are harmonically related to the fundamental input wave component.

Another principal object of the present invention is to provide a device of the type described for providing an output which is particularly insensitive to input wave components odd-harmonically related to, and in a basically in-phase relationship with, the fundamental input wave component, the conversion being accomplished in a manner which does not eliminate the ordinary insensitivity of a converter to out of phase odd harmonics and all even harmonics.

Another object of the present invention is to provide a device of the type described for providing a DC output which is related to the average value of the fundamental frequency component of the input waveform, in a manner that is highly insensitive to harmonic contamination on the input wave.

Another object of the present invention is to provide a device of the type described for providing a DC output which is related to the peak-to-peak value of the fundamental frequency component of the input waveform, in a manner that is highly insensitive to harmonic contamination on the input wave.

Yet another object of the present invention is to provide a device of the type described characterized by its capability for general use, ranging from application in simple one-fourth to one-half percent analog and digital multimeters to high-precision application as 0.01 to 0.1 percent AC-to-DC converter signal conditioners for digital and differential (potentiometric) voltmeters, with possibility of extension to use in 5 and 10 part-per-million precision AC-to-DC conversion equipment used in monitoring precision AC signals such as those used to drive the various inputs to low-drift gyroscopes employed in navigational systems.

Other objects of the present invention will in part appear obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 1:
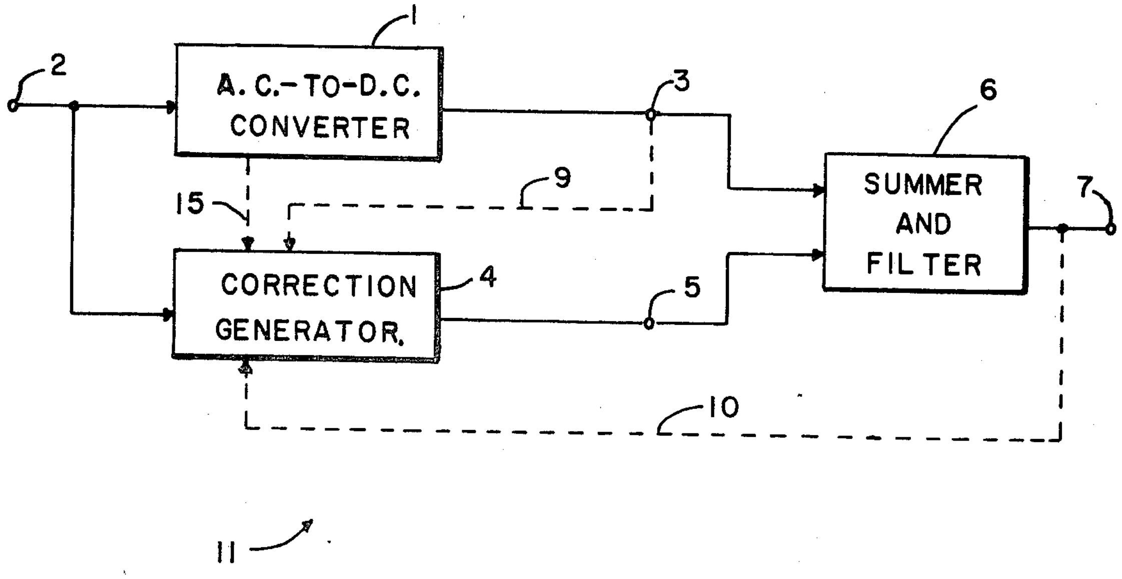
FIG. 1 is a block diagram illustrating the general form of the present invention.

Broadly described, the present invention is a device for generating, from the time-varying, periodic composite AC input signal consisting of a fundamental wave and related harmonic components, a correction signal, and for adding the latter to the output of a conventional AC-to-DC Converter also supplied by the same composite input signal. The correction signal is of such magnitude and polarity that when added, it almost completely eliminates the effects of the principal harmonic contamination to which the basic AC-to-DC Conversion is itself not insensitive. The Correction Generator may be either within a feedback loop or operating on an entirely open-loop basis. For example, the final output of the total AC-to-DC Converter including the Correction Generator may be employed to modify the operating point of the Correction Generator itself as hereinafter described in which case the Correction Generator is in effect within a feedback loop since it in turn partially determines the output of the entire AC-to-DC Converter. Alternatively, the Correction Generator may be controlled by the output of the uncorrected, basic AC-to-DC Converter, which the Correction Generator in turn does not influence since the output of the latter is added subsequently to the output of the basic AC-to-DC Converter. In this case, the Correction Generator is operating on an open-loop basis, that is to say it is not within a feedback loop. In yet another embodiment the Correction Generator is merely another AC-to-DC Converter of a type different from that of the principal AC-to-DC Converter, with sensitivity to harmonic components of the input wave which is different from that of the principal AC-to-DC Converter.

In any case, the Correction Generator furnishes a pulsed DC (if it is connected before the low-pass filter) or else a filtered, low-ripple DC if a filter is built into the Correction Generator and its output is added to that of the basic, uncorrected principal AC-to-DC Converter after its own low-pass filter.

The Correction Generator's output may be proportional to the peak-to-peak value or to the conventional full-wave of half-wave average value, or to some other function of the input waveform. Specifically, it may also be proportional to the average value of a portion of the composite input waveform, but not to the total. In any event the effect of a given harmonic of the input fundamental component on the Correction Generator's output is different with respect to the significance of the fundamental on that output, than is the effect of the same harmonic on the output of the basic AC-to-Dc Converter versus the effect of the fundamental on its output. Therefore, when the Correction Generator's output is added to that of the basic AC-to-Dc Converter's output in the correct amount, and the total rescaled to provide the desired overall scale factor for the composite output of the total AC-to-DC Converter incorporating the Correction Generator, the final output exhibits the desired harmonic insensitivity. As will be demonstrated later, essentially the Correction Generator can constitute means for selectively altering the gain of the Converter between predetermined phase angles of the fundamental wave so that the gain between those angles is one value while the gain outside of those angles is another or other values. The resulting device will hereinafter be referred to as a Harmonic-Insensitive Converter.

The basis AC-to-DC conversion technique employed for the conventional or principal AC-to-DC Converter is often an average-to-DC conversion, but may be a peak-to-peak conversion or some other AC-to-DC conversion method.

Referring now to FIG. 1 which contains a block diagram of the general form of the present invention, there is provided Conventional AC-to-Dc Converter means 1, adapted to accept a time-varying, periodic input signal applied to terminal 2, and furnishing an output at terminal 3 proportional to the magnitude of the input signal. Input terminal 2 is also connected to Correction Generator 4, which furnishes to its output terminal 5 a signal whose DC component is proportional to a specific characteristic of the said input signal which is a further subject of the invention.

Summing and low-pass filtering means 6 in FIG. 1, with two inputs, derived from terminals 3 and 5 respectively, functions to add the output signals from Conventional AC-to-DC Converter means 1 and Correction Generator means 4, and filter them in a low-pass filter to remove ripple and higher harmonics. The signal output at terminal 7 of filtering means 6 is the DC output from the total, or composite, Harmonic-Insensitive AC-to-DC Converter 11.

It is to be understood that the dotted path 15 in FIG. 1 from an intermediate point within Conventional AC-to-DC Converter means 1 to Correction Generator means 4 indicates that the input to means 4, or a portion of that input, may in fact be taken after some preliminary computation or modification, from a point within Conventional AC-to-DC Converter means 1. And the dotted paths 9 and 10 from the output of Conventional AC-to-DC Converter means 1 and from the output of Summing and Filtering means 6 to Correction Generator means 4 represent alternate paths for a DC input signal to Correction Generator means 4, the purpose of which is to assist in selecting the characteristic of the input signal which is computed in the Correction Generator means. When dotted path 10 is employed for this purpose as the DC input signal to Correction Generator means 4, the resulting configuration is a feedback configuration, since a feedback loop is set up as follows: Correction Generator means 4 to terminal 5 to Summing and Filtering means 6 input, via path 10 back to Correction Generator means 4. On the other hand, dotted path 9 which is alternate to path 10, is not representative of a feedback connection since when it is used instead of path 10, there is no connection from the output of Summing and Filtering means 6 back to either of the two basic blocks, Conventional AC-to-DC Converter means 1 or Correction Generator means 4; and for this reason this latter configuration employing path 9 rather than path 10, is a nonfeedback or open loop configuration.

Referring still to FIG. 1, Correction Generator means 4 is an auxiliary AC Converter, which has a different sensitivity to harmonic influence (with respect to fundamental sensitivity) than the Conventional AC-to-DC Converter means 1; so that when its output is added to that of Converter means 1 (if appropriate sign and scale factors are used) the effect can be that of totally eliminating or else of substantially reducing the effect of one or more preselected harmonics on the total output appearing at terminal 7. As means for helping automatically to select the manner in which Correction Generator means 4 functions to perform its specialized AC-to-DC conversion, a DC signal representative of the total output signal from Harmonic-Insensitive AC-to-DC Converter 11, appearing on terminal 7, may be used via the connection on path 10, to establish what can be a clipping level or selection level within Correction Generator means 4. Alternately, the normal, uncorrected output of the Conventional AC-to-DC Converter means 1 appearing on terminal 3 may be used for this purpose, via the connection of path 9 to Correction Generator means 4. Each of these two alternatives for assisting in determining the exact functional characteristic of the AC-to-DC conversion accomplished by Correction Generator means 4 has its special advantages and disadvantages, as will become apparent in connection with a detailed description of various specific embodiments of both possibilities.

Figure 2:
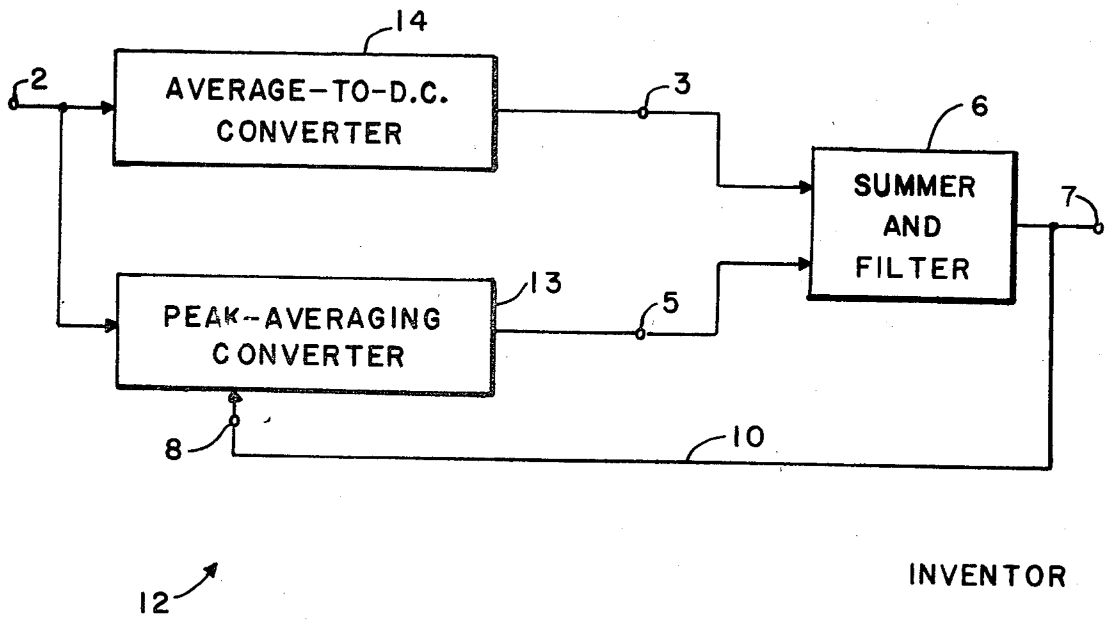
FIG. 2 is a block diagram of one embodiment of FIG. 1 in greater detail.

FIG. 2 is a more specific embodiment of the invention, of what was referred to in connection with FIG. 1 as the feedback configuration, and for the specific case in which Conventional AC-to-DC Converter means 1 in FIG. 1 is Conventional Average-to-DC Converter means 14 in FIG. 2. As in FIG. 1, the input signal whose DC-proportional output value is desired, is applied to input terminal 2; from whence it is furnished as input to Conventional Average-to-Dc Converter means 14. The input appearing at terminal 2 is also furnished to Correction Generator means 13, which in this embodiment is a Selected-Clipping-Level, Peak-Averaging Converter. Outputs of Correction Generator means 13 and Conventional Average-to-DC Converter means 14, appearing at terminals 5 and 3 respectively, are applied as the two inputs to Summer-Filter means 6 as before in FIG. 1. The output of the latter is the total output of the composite Harmonic-Insensitive Average-to-DC Converter 12 on terminal 7. Connection 10 from output terminal 7 to an auxiliary input terminal, designated 8 in FIG. 2, to the Correction Generator means 13, is shown explicitly in this embodiment.

Figure 3:
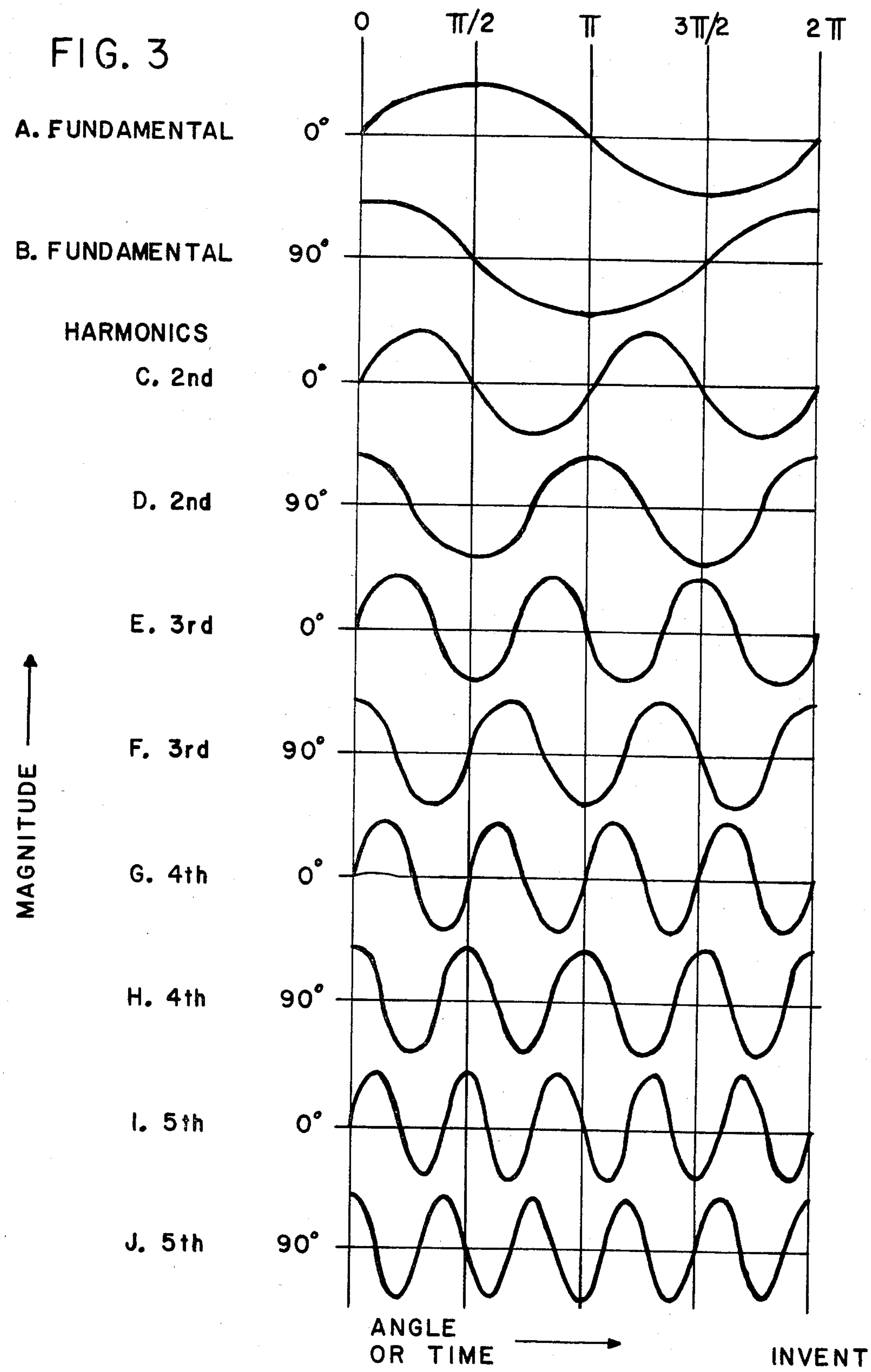
FIG. 3 is a graphical representation showing an exemplary input fundamental wave with exemplary harmonic contamination wave components.

Referring now to FIG. 3, there will be seen a graphical representation of input fundamental in-phase or 0° and quadrature or 90° waves, with exemplary second, third, fourth and fifth harmonic wave components, all of the components also being shown both in their sine or 0° and cosine or 90° phase shifts with respect to the fundamental.

Throughout the entire discussion which is to follow, it is assumed that any statements that hold true in general for 0° waves or for 90° waves, hold true with equal force for 180° and 270° waves respectively.

As is well known to those skilled in the art, Fourier analysis shows that a sine wave of any phase shift may be synthesized by adding two other sine waves of the same frequency and appropriate amplitude, one of the added waves to be at either 0° or 180° phase shift, the other wave at either 90° or 270° phase shift. For this reason it is sufficient in consideration of the effects of harmonics on a computation such as an average computation, to be concerned merely with a sine (the 0° or 180° phase shift wave) and cosine (the 90° or 270° phase shift wave) at each harmonic, to be able completely to characterize the effects of the harmonics on the computation. And since there is no functional difference between 0° and 180° waves, and between 90° and 270° waves, it is sufficient merely to consider 0° and 90° waves to be able to completely characterize the effects of the harmonics on the AC-to-DC conversion.

FIGS. 3A and 3B show 0° and 90° phases respectively of the fundamental, for reference purposes; FIGS. 3C and 3D show 0° and 90° phases respectively for the second harmonic; FIGS. 3E and 3F show 0° and 90° phases respectively of the third harmonic; FIGS. 3G and 3H show 0° and 90° phases respectively of the fourth harmonic; while FIGS. 3I and 3J show 0° and 90° phases respectively of the fifth harmonic. While additional harmonics, of still higher order, may exist in the input signal in the general case, performance with respect to them for the Harmonic-Insensitive AC-to-DC Converter may be readily inferred from that associated with the first four, (second through fifth), which are depicted in FIG. 3.

The relative magnitudes of the fundamental and its harmonics in FIGS. 3A through 3J are not meant to be representative of an actual situation for which the instant invention is intended to perform. Rather, the invention is of interest and is applicable only when the magnitudes of the various harmonics with respect to the fundamental signal are sufficiently small that the addition of harmonics to the fundamental to compose the total, composite input signal, leaves the number of zero axis crossings unchanged, i.e., there remain but two axis crossings per fundamental cycle for the composite wave. This restriction however does little to diminish the usefulness of the instant invention since it implies merely that the harmonic magnitudes be less than 10 or 20 percent of the fundamental. Situations in which a precision, harmonic-insensitive average-to-DC conversion are generally desired in industry, are restricted to input waves whose total harmonic content is typically less than 5 percent. To show such small waves in FIGS. 3C through 3J however, would make analysis difficult; hence they are arbitrarily shown for analytical purposes as roughly the same magnitude as the fundamental signals in FIGS. 3A and 3B.

Evidently if an in-phase or 0° even harmonic such as the second or fourth, FIGS. 3C or 3G, be added (in small or moderate amount as hereinbefore mentioned) to an in-phase fundamental such as shown in FIG. 3A, the net effect of the harmonic on the average value of the composite or total signal resulting from said addition will be zero. This follows from the fact that within each half-cycle of the 0° fundamental (shown in FIG. 3A), there are two equal and opposite-polarity half-cycles of the 0° second harmonic (shown in FIG. 3C), two sets of two equal and opposite-polarity half-cycles of the 0° fourth harmonic (shown in FIG. 3G), and so on by inference for all higher order, 0° or in-phase even harmonics.

The same situation is essentially true as well for the 90° even harmonics, specifically for the 90° second harmonic (shown in FIG. 3D) and the 90° fourth harmonic (shown in FIG. 3H). However for the 90° cases, since the values of the harmonics are not zero at the axis crossing points of the fundamental of FIG. 3A, they cause a small, neglectable error due to this second-order effect, on the average value of a composite waveform made up of a fundamental and a series of 90° even harmonics. The magnitude of the effect is 0.005 percent for 1 percent harmonic, 0.125 percent for 5 percent harmonic content, compared with significantly higher errors (0.33 and 1.67 percent respectively for the two examples given) for 0°, third harmonic contamination, for example. Thus, for all practical purposes a conventional average-to-DC conversion may be said to be virtually insensitive to all even harmonic contamination in small to moderate amounts—e.g., up to 5 percent. (These considerations, extended to cases of very large harmonic contamination as well in which there are more than two axis-crossings of the composite wave during a fundamental period, are covered in the paper *R.M.S. Measurement of AC Voltages*, by F. C. Martin, in the publication *Instruments and Control Systems*, Jan. 1962.)

With regard to 90° odd harmonics such as the third of FIG. 3F or the fifth of FIG. 3J, the situation is the same as for 0° even harmonics; namely, there is zero effect on the average of the composite made up of fundamental and 90° harmonic. This is so even though, as with the 90° even harmonics, the value of the 90° odd harmonics is nonzero at the points at which the axis crossings of the 0° fundamental occur. The values of the 90° odd harmonic are equal and opposite at the beginning and end of each fundamental half-cycle, so that the second-order effects, such as also occur with the 90° even harmonics, exactly cancel and there is zero effect.

Thus the effect on average value of all harmonics save the 0° odd harmonics is either zero or neglectable. As can be seen from FIG. 3E, during the first half-cycle of the 0° fundamental, there are three half-cycles of the 0° third harmonic. While the first two cancel since they are opposite in polarity, the third introduces a substantial change into a composite signal comprising the 0° fundamental and the 0° third harmonic. It is, in fact, a positive change for the situation shown as exemplary in FIGS. 3A and 3E, since the one-half cycle that is left over is positive going. Thus, the average value of the composite signal will be greater for the situation shown in FIGS. 3A and 3E. If the phase of the 3E signal were taken instead as 180°, the residual one-half cycle of the third harmonic would become negative, and the value of the composite average decreased as a consequence. An analogous situation obtains for the second half of the fundamental, so that the net effect is the same whether half-wave or full-wave averaging is employed.

It is possible to generate an auxiliary correction, a function of a general input signal, that responds with a different proportional effect of third—in fact 0° odd harmonic of any order—versus fundamental, and which does not increase the effect of other harmonic components (which have been shown to be negligible or zero in a conventional average computation). Addition of this auxiliary signal with the appropriate sign and relative magnitude to the output of a conventional converter insures that the effect of the 0° third and some other 0° odd harmonics may be virtually eliminated, without increasing the already negligible effects of the other harmonic components—i.e., even harmonics and 90° odd harmonics.

Figure 4:
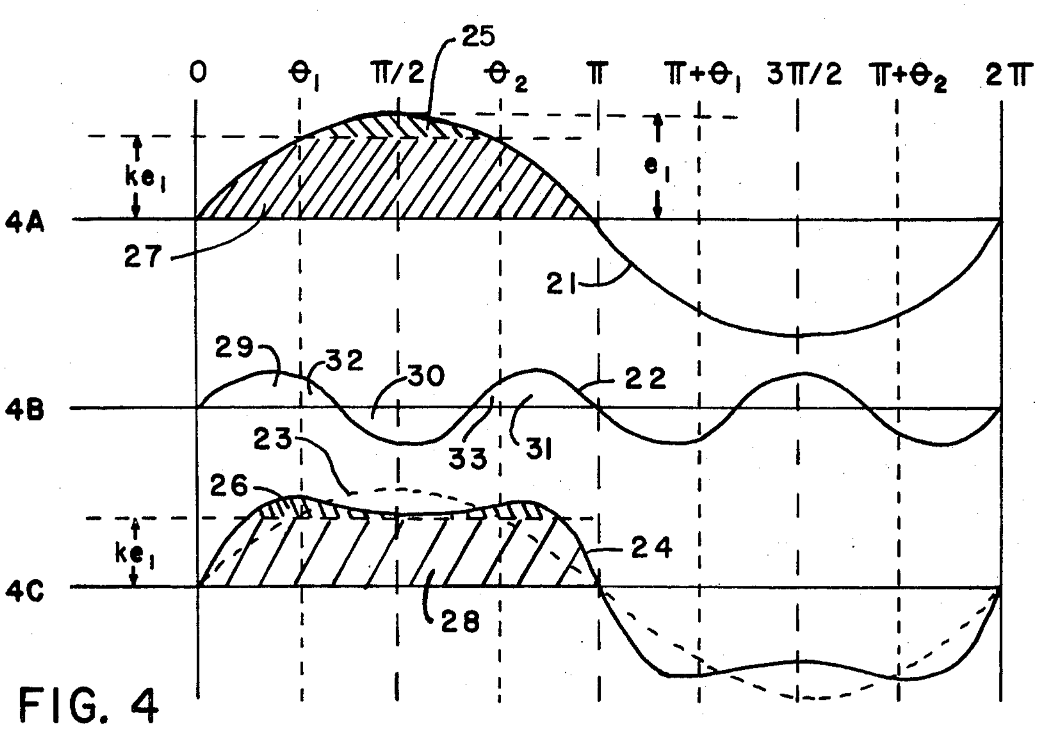
FIG. 4 is a graphical representation of a fundamental wave and in-phase third harmonic wave component.

One system for generating such a correction function, in this case an auxiliary partial average, may be understood by reference to FIG. 4, wherein are shown a fundamental and 0° or in-phase third-harmonic wave components. FIG. 4A depicts the fundamental wave 21, while FIG. 4B shows the in-phase or 0° third harmonic wave 22. FIG. 4C shows first, as a dotted line 23, the fundamental wave depicted as 21 in FIG. 4A; and in addition a wave 24 which is a representation of the sum of fundamental wave 21 from FIG. 4A, repeated as wave 23 in FIG. 4C, and third harmonic wave 22 from FIG. 4B.

In addition to the conventional axis-crossings at 0, $\pi$ and $2\pi$ shown for the fundamental wave 21 in FIG. 4A, and the designation of the positive peak as the angle $\pi/2$, there are two additional angles shown in FIG. 4A, namely $\theta_1$ and $\theta_2$, on either side of the positive peak at $\pi/2$. With reference to FIG. 4B, it may again be seen as mentioned hereinbefore, that during the first half cycle of the fundamental wave 21 in FIG. 4A, that is from 0 to $\pi$, there are three half-cycles of the third harmonic wave 22 in FIG. 4B, designated 29, 30 and 31 respectively. The average value of half-wave 29 will exactly cancel the average value of half-wave 30, leaving the substantial value of half-wave 31 to introduce an error or change in the computation of the average value of the composite waveform made up of the fundamental 21 of FIG. 4A and the third harmonic 22 of FIG. 4B, as depicted as the total or composite wave 24 in FIG. 4C.

In one embodiment of the invention of FIG. 1, shown in FIG. 2, Correction Generator 4 in FIG. 1 becomes the specific, Selected-Clipping Level, Peak-Averaging Converter 13. With reference to FIG. 4, the clipping level of Correction Generator 13 of FIG. 2 is selected in a manner to be described, so as to clip the input waveform between the angles $\theta_1$ and $\theta_2$ respectively, with reference to FIG. 4A; or since $\theta_1$ and $\theta_2$ are symmetrically disposed about the peak of the fundamental wave 21 at $\pi/2$, a single clipping level is determined with respect to the positive peak amplitude $e_1$ of the fundamental wave 21 in FIG. 4A for example, designated as $ke_1$ also in FIG. 4A.

As shown in FIG. 4B, the vertical lines projected downwards from the $\theta_1$ and $\theta_2$ intercepts in FIG. 4A, cut off small positive segments 32 and 33 from the two positive half-cycles 29 and 31 respectively of the third harmonic wave depicted in FIG. 4B. If an average were taken of the value of the third harmonic wave 22 only between the angles $\theta_1$ and $\theta_2$, it would include the predominant negative half-wave 30, plus the small positive wave-segments 32 and 33. If the average value of the fundamental-plus-third-harmonic or composite wave 26 of FIG. 4C is computed between $\theta_1$ and $\theta_2$, it will reflect therefore a predominantly negative error or change due to introduction of the in-phase or 0° third harmonic, the amount of the negative change being dependent upon the exact location of the angles $\theta_1$ and $\theta_2$.

If the angles $\theta_1$ and $\theta_2$ in FIG. 4 were selected as exactly 60° and 120° respectively, the average value of the third harmonic computed between those two angles would be exactly equal to one-half wave of the third harmonic. If the partial average so computed were added with equal weight to the conventional average value of the composite wave 24 in FIG. 4C, the positive half-wave error or change in the conventional average would be exactly offset by the negative half-wave error or change in the average of the peak computed between $\theta_1$ and $\theta_2$, so that the net effect of the in-phase or 0° third harmonic on the total, or composite average value, would in fact be zero. Application of a simple scale factor correction—gain in the broad sense or in this case, actually attenuation—to the final result, will restore the usual relation between the peak value of the input fundamental and the computed average value, which would otherwise be different from the conventional value in view of the fact that there is a fundamental component in the peak of the signal which occurs between $\theta_1$ and $\theta_2$, which when added to the normal average, would cause it to become excessively large.

However, selection of $\theta_1$ and $\theta_2$ as 60° and 120° respectively, in which case the small positive segments 32 and 33 of the wave 22 in FIG. 4B vanish, is not necessary to functioning of Correction Generator means 13 of FIG. 2. If the two angles are taken as different from the values of 60° and 120°, so long as they remain symmetrically disposed about $\pi/2$, a simple scale factor change with respect to the Correction Generator means' output—the value of the average of the peak selected by the two angles, $\theta_1$ and $\theta_2$—can make the net value of the average component due to the third harmonic in the Correction Generator means' output equal to one negative half-cycle of the third harmonic. Thus, when the scaled, average value of the selected peak is added to the conventional average, which contains an error or change equal to one-half positive cycle of the third harmonic as hereinbefore described, the result will be independent of the magnitude of the third harmonic, as before. Under these circumstances the amount of fundamental in the average value of the selected peak will then be different from the first example in which $\theta_1$ and $\theta_2$ were taken as 60° and 120° respectively, so that after the correction is generated and scaled, and added to the output Converter means 14, a scale factor different from that which was used in the 60°–120° example for the final, composite average, will be necessary to restore the normal expected relationship between peak value of input fundamental and average value of the output signal.

There is a restriction with regard to the freedom of choice just described for the angles $\theta_1$ and $\theta_2$, arising from the fact that if the average of the peak so-selected is to be added to the output of Converter means 14, the effect of the 0° third harmonic on the average value of the peak so selected must be predominantly negative. Thus $\theta_1$ and $\theta_2$ must be greater than 30° and less than 150° respectively (representing the positions of the positive peaks of the two positive half-cycles of the 0° third harmonic designated 29 and 31 respectively in FIG. 4B), or else the effect of the third harmonic on the average of the peak so selected will become zero and then as $\theta_1$ and $\theta_2$ become less than 30° and greater than 150° respectively, the total effect will become positive. Thus, when the average of the peak is added to the conventional average, there will no longer be cancellation but rather addition of the components of the two averages—the peak and the conventional—which depend on and are a function of the 0° third harmonic magnitude. For this situation it is necessary to subtract, rather than to add, the two averages.

The average of the peak of the composite waveform 24 of FIG. 4C selected between the angles $\theta_1$ and $\theta_2$, when combined with the absolute value of the average of the second (negative) peak from $180+\theta_1$ to $180+\theta_2$, will not when added to (or subtracted from) the value of the conventional average of the composite waveform 24 of FIG. 4C, generate adverse influence on the total, composite average so computed, due to even harmonics or 90° odd harmonics of the original input signal, which might exist simultaneously with 0° odd harmonics in a practical industrial measurement situation. Inspection of FIGS. 3A through 3J shows that an average taken symmetrically about $\pi/2$ will be zero for 0° even harmonics and 90° odd harmonics. The effect of 90° even harmonics is opposite for the positive and negative peaks of the fundamental (i.e., for averages taken about $\pi/2$ and $3\pi/2$ respectively), so that when the absolute average (i.e., full-wave) of the sum of the two peaks is considered, it will be totally insensitive, as is the conventional average itself, to all even harmonics and to 90° odd harmonics.

The 0° third harmonic of FIG. 3E has been treated hereinbefore, as it was in fact to suppress the effect of this component that Correction Generator means 4 and 13 respectively were employed in the FIG. 1 and FIG. 2 embodiments of the instant invention. However, inspection of FIG. 3I showing the 0° fifth harmonic, shows that selection of the correct $\theta_1$ and $\theta_2$ could in fact be used to obtain cancellation of the positive half-cycle that remains if an average of the fifth harmonic is made in the conventional manner over the interval 0 to $\pi$, in the same way that was described hereinbefore for the third harmonic. It will also become apparent that third and fifth 0° harmonics can be cancelled simultaneously, and under circumstances in which simultaneous cancellations of higher odd in-phase harmonics may also be effected.

Thus taking the average value of the input composite waveform of FIG. 2, for example, at terminal 2, within Correction Generator 13, in an absolute, full-wave sense, between the angles $\theta_1$ and $\theta_2$ and between $\mathbf{180}+\theta_1$ and $\mathbf{180}+\theta_2$ of FIG. 4, and adding it (on terminal 5, FIG. 2) with an appropriate scale factor to the output from Converter 14 appearing at terminal 3, in the Summer and Filter 6, yields an output which remains virtually as insensitive to even harmonics of both 0° and 90° phases as well as odd harmonics of 90° phase (with respect to the fundamental), as is the Converter 14, yet adds a measure of insensitivity to at least one and in some cases many of the 0° odd harmonic components which is far greater than the insensitivity to those components displayed by the Converter 14.

Consider the area designated 26 in FIG. 4C, above the peak-clipping potential $ke_1$ where $e_1$ is the peak of the fundamental component of the input signal and $k$ is a constant to be determined. It is given by the integral of the function consisting of the fundamental and for generality, the peak amplitude $e_n$ of the $n$th harmonic, minus the area under the clipping line at $ke_1$; or $$\text{Area}_{26}=\int_{\theta_1}^{\theta_2}(e_1\sin\theta+e_n\sin n\theta)\,d\theta-ke_1(\theta_2-\theta_1) \quad (1)$$

The assumption that $\theta_1$ and $\theta_2$ are symmetrically disposed about the angle $\pi/2$ implies that $$\theta_2=\pi-\theta_1 \quad (2)$$

Equation (1) may be integrated and reduced, with the aid of equation (2), to yield:

$$\text{Area}_{26}=e_1\cos\theta_1-ke_1(\pi-2\theta_1)+(2e_n/n)\cos n\theta_1 \quad (3)$$

for $n$ odd, which is the only case of interest.

For $k=0$, equation (3) reduces to the familiar expression:

$$\text{Area}_{26_0}=2e_1+(2e_n/n) \quad (4)$$

from which the average value of a half-wave containing a single, $n^{th}$ order odd harmonic with peak value $e_n$ may be calculated merely by dividing by the interval $\pi$, e.g., $$\text{Average}=(2/\pi)e_1+(2/\pi)(e_n/n) \quad (5)$$

What is wanted is the sum of (4) and (3), with appropriate scale factors, for the total output for the invention. Designating that total $A_T$, let $$A_T=\alpha(A_0+\beta A) \quad (6)$$

where $A$ represents $\text{Area}_{26}$ given by equation (3), $A_0$ represents $\text{Area}_{26_0}$ given by equation (4), and $\alpha$ and $\beta$ are scaling constants to be determined.

Substituting for $A_0$ and $A$ from equations (4) and (3) respectively in equation (6), we have:

$$A_T=\alpha\left(2e_1+\frac{2e_n}{n}+\beta 2e_1\cos\theta_1-\beta ke_1(\pi-2\theta_1)+\beta\frac{2e_n}{n}\cos n\theta_1\right) \quad (7)$$

Reducing and collecting terms, $$A_T=2e_1\left(\alpha+\alpha\beta\cos\theta_1-\frac{\alpha\beta k}{2}(\pi-2\theta_1)\right)+\frac{2e_n}{n}(\alpha+\alpha\beta\cos n\theta_1) \quad (8)$$

The second term in equation (8), $(2e_n/n)((\alpha+\alpha\beta\cos n\theta_1)$, expresses the net, total effect of the harmonic $e_n$ on the total average $A_T$. If the coefficient $(\alpha+\alpha\beta\cos n\theta_1)$ is zero, then the influence of the harmonic $e_n$ on the total average $A_T$ will be zero. Therefore, let $$\alpha+\alpha\beta\cos n\theta_1=0 \quad (9)$$

for $n=3$ and $n=5$ simultaneously, to simultaneously eliminate effects of the two most important 0° odd harmonic. For $\alpha$ nonzero, equation (9) implies $$1+\beta\cos n\theta_1=0 \qquad n=3,5 \quad (10)$$

Solving, $$\cos n\theta_1=-(1/\beta \qquad \text{for } n=3,5 \quad (11)$$

Since $\beta$ is taken positive by assumption, equation (11) states that $\cos n\theta_1$ is negative for both third and fifth harmonics, or that $3\theta_1$ and $5\theta_1$ are each in quadrant II or III, where the cosine is negative.

Assuming $3\theta_1$ is in quadrant II, and $5\theta_1$ in quadrant III, and further that they are symmetrically disposed about $\pi$ so that equation (11) will be satisfied simultaneously for both, i.e., their cosines are equal, we may state:

$$3\theta_1=\pi-x \quad (12)$$

and $$5\theta_1=\pi+x \quad (13)$$

Equations (12) and (13) express the fact that $3\theta_1$ and $5\theta_1$ are symmetrically disposed about the angle $\pi$. The sum of (12) and (13) is $$8\theta_1=2\pi \quad (14)$$

from which it follows that $$\theta_1=\pi/4 \quad (15)$$

Thus by selecting $\theta_1=\pi/4$ (and from (2), $\theta_2=\frac{3}{4}\pi$), the embodiment of FIG. 2 can be made insensitive to both 0° third and fifth harmonics simultaneously.

Broadly, the instant invention may be made insensitive to any two, 0° odd harmonics. If we consider the $i^{th}$ and $j^{th}$ harmonics, and let $i\theta_1$ be in quadrant II and $j\theta_1$ be in quadrant III, $$i\theta_1=\pi-x \quad (16)$$

and $$j\theta_1=\pi+x \quad (17)$$

The sum yields:

$$(i+j)\theta_1=2\pi \quad (18)$$

or $$\theta_1=2\pi/(i+j) \quad (19)$$

so that, for example, if it is desired to desensitize the average conversion to third and seventh harmonics, from equation (19) $\theta_1$ would be $\pi/5$.

If third and fifth are the selected harmonics (as will usually be the case since they predominate in actual measurement situations in their effect is greatest since their harmonic numbers are the lowest), then every alternate adjacent pair of odd harmonics are also eliminated from influencing the total average $A_T$, i.e., 11th and 13th, 19th and 21st, and so on. This may be seen from the fact that if equation (10) is true for $n=3$ and 5, implying $\theta_1=\pi 14$ as already shown, then it follows from equation (10) that:

$$1+\beta\left(-\frac{\sqrt{2}}{2}\right)=0 \quad (20)$$

or $\beta=\sqrt{2}$ (21)

Hence equation (10) is true for all $n$ that imply that cos $n\theta_1$ $=-\frac{1}{\sqrt{2}}$ as stated in equations (11) and (21). But for $\theta_1=\pi/4$, cos $n\theta_1$ is $-\frac{1}{\sqrt{2}}$ for $n=11$, 13, 19, 21, 27, 29, and so forth.

$\theta_1=\pi/4$ implies, from FIG. 4A, that since $k$ equals the sine of $\theta_1$ (from the figure), $$k=\sin \pi/4=\frac{\sqrt{2}}{2} \quad (22)$$

To restore the normal relationship between fundamental amplitude $e_1$ and average $A_T$ (see equation (5)), $A_T$ is to be $2e_1$. From equation (8) with the second term zero i.e., $n=3$ or 5, say, and $\theta_1=\pi/4$), $$A_T=2e_1=2e_1\ (\alpha+\alpha\beta\ \cos\theta_1\ -\frac{\alpha\beta k}{2}\ \ (\pi-2\theta_1) \quad (23)$$

Substituting for $\beta$ and $k$ from equations (21) and (22), and $\pi/4$ for $\theta_1$, (23) may be solved for $\alpha$:

$$\alpha=1/(2-\pi/4)=0.823 \quad (24)$$

Thus equation (24) gives the coefficient or attenuation $\alpha$ by which the conventional average ($A_O$ in equation (6)) must be multiplied, while equation (21) gives the coefficient $\beta$, which must be multiplied by (see equation (6)) to obtain the net coefficient by which the average of the peaks of the input must be multiplied. Note that the solution for these coefficients has been carried out only for a half-cycle; hence the coefficients are valid only for full-wave rectification for *both* the conventional average $A_O$ and the average A of the peaks. When the conventional averaging is carried out in half-wave fashion (with the peak averaging being carried out, as hereinbefore mentioned, as it must be always in a full-wave manner, in order to maintain invariance in the output DC for all other harmonics for which the conventional half-wave or full-wave average is itself normally invariant), the gain for the conventional average path to the final, composite output, must be twice that which was computed above, since the DC value computed on a half-wave basis is one-half that which is computed on a full-wave basis.

The level $ke_1$ at which the clipping must be set to occur, must be invariant with input harmonic contamination, yet no separate representation of the fundamental is available to enable computation of the point which is exactly $1/\sqrt{2}$ times the peak of the fundamental. In the embodiment of the instant invention depicted in FIG. 2 as well as in some of the other embodiments presented subsequently, the determination of the level at which the input's peaks are to be clipped and above which they are to be averaged is based on the single invariant (with respect to the fundamental peak of the input) which exists in the system: the output, harmonic-insensitive average. In the absence of effects of harmonics, the average value of a sine wave is given by the first term in equation (5), namely $$\bar{e}=(2/\pi e_1 \quad (25)$$

where $\bar{e}$ is used to denote correct, harmonic-invariant average. However, from equation (22), $k$ is $\sqrt{2}/2$. Therefore $$ke_1=(\ \frac{\sqrt{2}}{2}\ )e_1 \quad (26)$$

Substituting the value of $e_1$ which may be obtained from equation (25), namely $(\pi/2)\ \bar{e}$, into the right hand side of equation (26), yields:

$$ke_1=\frac{\pi\sqrt{2}}{4}\ \bar{e} \quad (27)$$

Thus if the total average, $\bar{e}$ is multiplied by $\frac{\pi\sqrt{2}}{4}$, it becomes the desired, invariant level $ke_1$ which is used to clip off and isolate the desired peaks of the input and inverted input waveforms, as shown in FIG. 4 and later figures.

Figure 5:
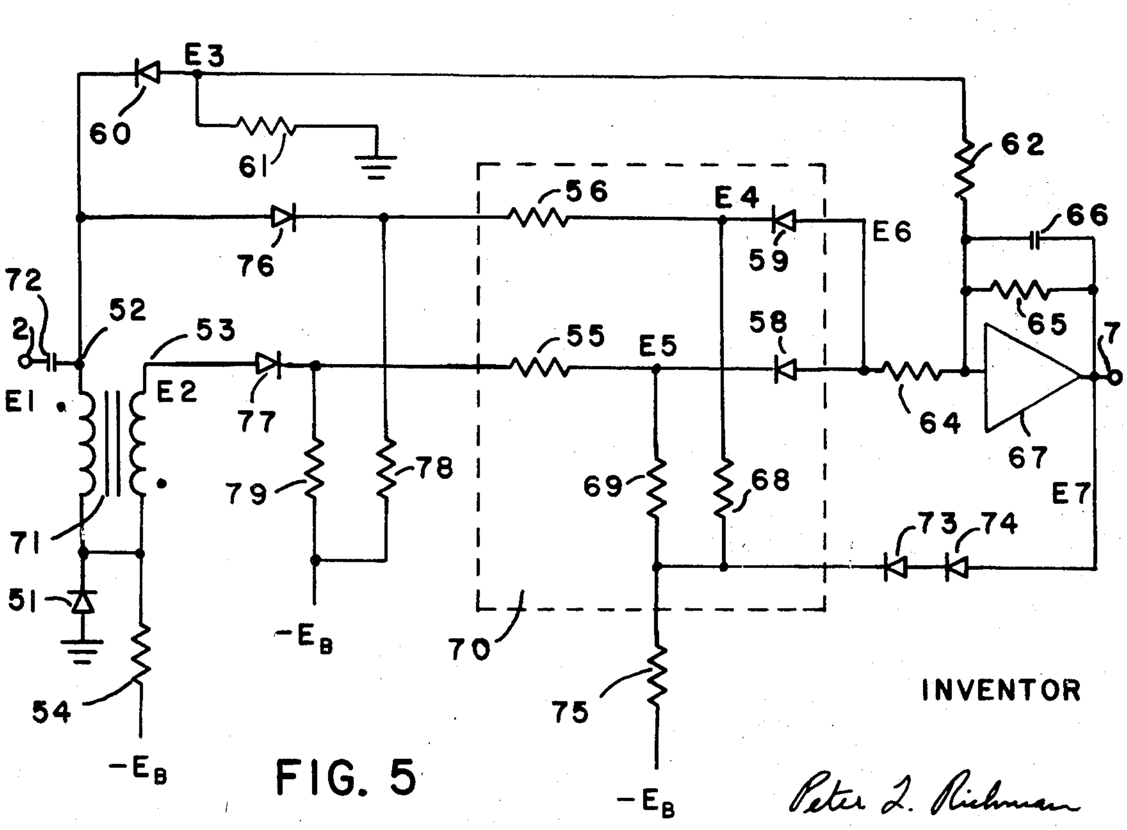
FIG. 5 is a schematic circuit diagram of one form of the embodiment of FIG. 2 in greater detail.

Referring now to the schematic diagram of FIG. 5, it is a representation of one specific embodiment of the block diagram of FIG. 2. It represents a medium-precision basic average-to-DC converter, with correction generator of comparable performance capabilities connected as an embodiment of the feedback method represented in FIG. 1 by use of the dotted path 10, and explicitly in FIG. 2.

Specifically, in FIG. 5 the input signal applied to terminal 2 is assumed to contain not only a fundamental wave, but also an assortment of harmonic components depending on the particular industrial measurement situation, but which in no case cause the composite wave to display more axis crossings during a single cycle of the composite wave than the number of axis crossings inherent in the fundamental itself, namely two. This input is applied via coupling capacitor 72 to rectifier 60 shown for exemplary purposes, although it will be understood from the foregoing and by those skilled in the art that a full-wave rectifier employing two rectifying elements would be equally as satisfactory. Resistor 61 acts as a return path to ground for the output of the rectifier 60, which is poled with its cathode connected to the input terminal 2 via capacitor 72, and its anode to the return resistor 61, so that the pulsating DC potential developed across the return resistor 61 is negative.

The input on terminal 2 is also applied via coupling capacitor 72 to the primary 52 of inverting transformer 71, whose secondary 53 makes available to the Correction Generator (to be described) a polarity of input which is opposite or 180° out of phase with the polarity of the input applied to terminal 2. The transformer is shown as exemplary; an inverting amplifier, for example, might also be used with equal effectiveness.

The specific Correction Generator 13 of FIG. 2 is shown as the Correction Generator 70 in FIG. 5, within the dotted lines. It consists of a full-wave rectifier (diodes 59 and 58) driven by the two oppositely poled, equal-magnitude inputs (one from terminal 2 via capacitor 72, the other from the secondary 53 of the inverting transformer 71), supplied through buffering resistors 56 and 55 respectively, and biased via resistors 68 and 69 respectively by the final output of the composite, Harmonic-Insensitive Average-to-DC Converter appearing at terminal 7. Since, as will be shown, output $E_7$ appearing at terminal 7 is a positive DC potential, the waves appearing at the high sides of the primary 52 and secondary 53 of the inverting transformer 71, are biased off in a positive direction via the divider action of resistors 55 and 69 for the secondary wave, and 56 and 68 for the primary wave, respectively. Thus, the resulting signals at the anode outputs of the rectifying diodes 58 and 59 remain but the negative peaks of the original waves, the portion of the waves being selected depending on the scaling ratios between resistors 55 and 69, and 56 and 68, and the magnitude of the positive DC output signal on terminal 7.

Diode 51 in conjunction with resistor 54 to a negative battery or DC source $-E_B$, biases both primary 52 and secondary 53 in a negative direction by the drop of one diode: typically 0.6 volt for silicon. Diodes 76 and 77, in conjunction with resistors 78 and 79 respectively, add an additional diode drop bias to the waves applied to the Correction Generator. Diodes 73 and 74, in conjunction with resistor 75 to negative battery potential $-E_B$, provide a double diode drop bias in the negative direction for the fed-back output DC $E_7$. All of these biases are used to overcome or cancel diode drops in rectifier 60 and rectifiers 58 and 59. One diode drop (that due to diode 51) is sufficient for cancellation of the drop due to diode 60; while a two-diode drop is required for the three inputs to the Correction Generator 70, namely the two oppositely poled AC inputs (from the primary and secondary of transformer 71) and the DC input from $E_7$, in view of the approximately 2:1 attenuation implied by approximately equal resistors 55 and 69, and 56 and 68, in the input networks to the Correction Generator 70. The second diode drop for the two AC inputs is supplied via diodes 76 and 77 respectively. The two-diode drop for the DC feedback $E_7$ is generated by the two diodes 73 and 74 as hereinbefore mentioned. It should be noted that the entire method of cancelling rectifying diode drops via diodes 51, 73, 74, 76 and 77 is optional, since the embodiment of FIG. 5 would equally well remain harmonic insensitive; but that for greater accuracy in the total average conversion, the method shown for diode drop cancellation, or some equivalent, should be employed.

The negative peaks of the input waves, after passing through the diodes 58 and 59, are summed (via the connection in common of the anodes of the diodes 58 and 59), and are applied as the Correction Generator output, to an input resistor 64 to the Summer-Filter operational amplifier 67. The second input to the amplifier 67 is the output of the conventional rectifier or average converter, appearing at the anode of rectifier 60 as hereinbefore mentioned and described, and it is applied to the input resistor 62 of the Summer-Filter. The feedback network of said operational Summer-Filter 67 consists of resistor 65 which provides suitable scaling in conjunction with input resistor 62, for the conventional average potential applied thereto; and in conjunction with input resistor 64, for the output of the Correction Generator, the average values of the peaks selected between angles $\theta_1$ and $\theta_2$ (from FIG. 4) as hereinbefore described.

Figure 6:
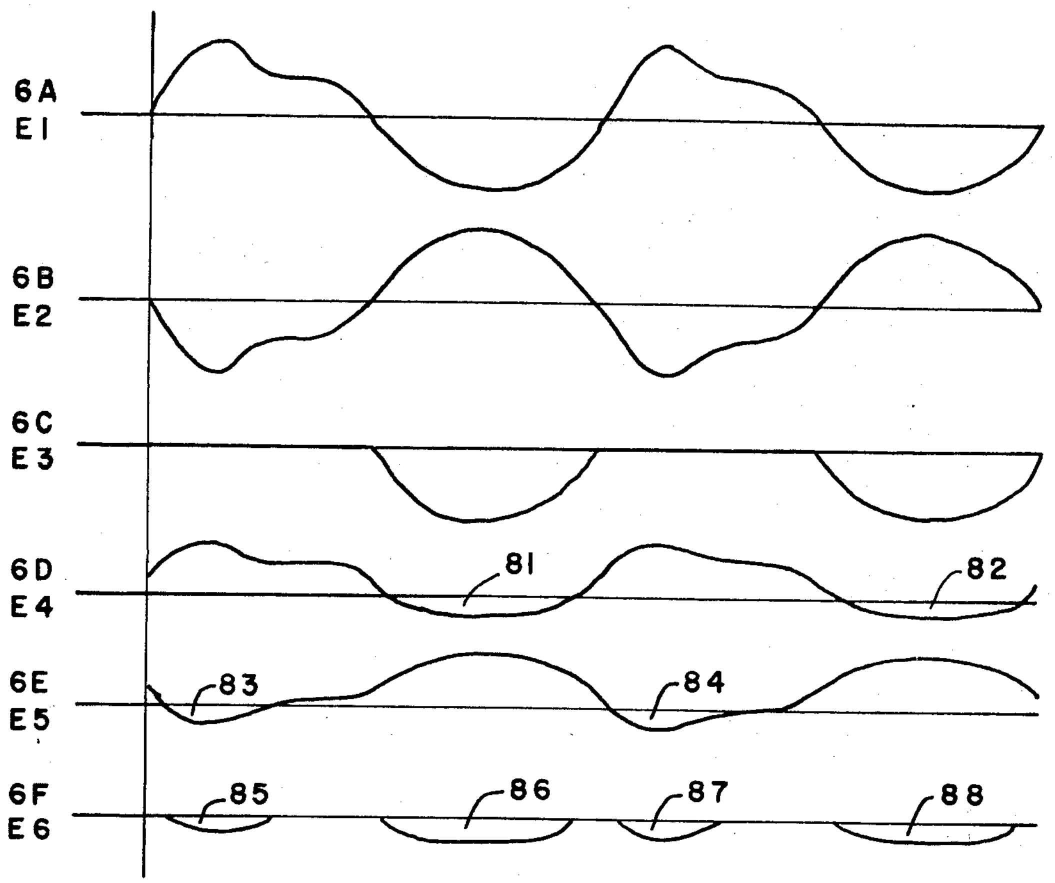
FIG. 6 is a graphical representation of exemplary waveforms of the circuit of FIG. 5.

FIG. 6 is a graphical representation of exemplary waveforms from the circuit of FIG. 5, ignoring all diode drops as operationally unimportant. FIG. 6A shows a typical input wave, a pure fundamental contamination by several harmonics, typical of the kind of wave that might be encountered in industrial measurement situations. The wave is designated $E_1$, and is shown being applied to input terminal 2 in FIG. 5.

FIG. 6B is a representation of the output of inverting transformer 71, appearing at the high end of the secondary 53 and there designated $E_2$. It is identical with $E_1$ except that its polarity is reversed, due to the 180° phase shift through the action of the inverting transformer 71. In the actual waveforms of FIGS. 6A and 6B, the offset potential of diode 51 would appear, biasing both signals slightly negative (i.e., the positive peaks of both signals aren't quite as high as the negative peaks).

FIG. 6C shows the wave $E_3$ appearing at the output or anode side of rectifier 60 in the conventional average (half-wave) computation of FIG. 5. It is merely the negative portion, including the bias due to diode 51, of the input wave of FIG. 6A, $E_1$.

FIG. 6D shows the wave $E_4$ appearing at the junction of series resistor 56 and shunt, biasing resistor 68; the bias resistor being driven as shown in FIG. 5, by the output potential $E_7$ appearing at terminal 7 or the composite, harmonic-insensitive converter. Thus the signal at $E_4$ shown in FIG. 6D is approximately half of the signal at the input to series resistor 56, namely $E_1$ (since there is assumed to be zero attenuation through the capacitor 72), smaller in view of the attenuation provided by the action of the divider composed of resistors 56 and 68, i.e., reduced by a factor equal to the value of resistor 68 divided by the sum of the values of resistors 56 and 68.

In addition, the signal at $E_4$ shown as the waveform of FIG. 6D, will contain an offset which is a fraction of $E_7$ multiplied by the value of resistor 56 divided by the sum of the values of resistors 56 and 68. Similarly, the resistors 55 and 69 operating in conjunction with inverted input wave $E_2$ (of FIG. 6B) appearing at the secondary 53 of transformer 71, and the output DC $E_7$, generate the reduced, offset potential $E_5$ shown in FIG. 6E. The portions of the waves of FIGS. 6D and 6E that are below the zero axis are designated 81 and 82 for the wave of FIG. 6D, and 83 and 84 for the wave of 6E. These are the only portions of the two waves that pass, respectively, through rectifiers 59 and 58, to be summed at the junctions of said rectifiers' anodes as shown in FIG. 5, resulting in the wave $E_6$ depicted in FIG. 6F, as the sum or presence of the negative peak wave segments 81 and 82 from wave $E_4$ of FIG. 6D with the negative peak wave segments 83 and 84 from wave $E_5$ of FIG. 6E. This train of peaks, represents the desired full-wave rectified peaks selected between the angles $\theta_1$ and $\theta_2$ as hereinbefore described, with the angles selected in a manner dependent on the relative values of the various resistors in the circuit of FIG. 5.

The wave $E_6$ at the junction of the anodes of diodes 58 and 59, plus the wave $E_3$ (FIGS. 6F and 6C respectively), are summed via input resistors 64 and 62 respectively, into operational Summer-Filter amplifier 67, with feedback network composed of resistor 65 and parallel capacitor 66 as hereinbefore described. The resulting output potential is the inverse of the polarity of the sum of the inputs, which was negative, in view of the fact that the gain of amplifier 67 is negative. Hence the output DC potential $E_7$ is positive, in view of the inverting action of the amplifier 67 in a manner well known to those skilled in the art. This output DC then is the desired harmonic-insensitive average representation of the input wave $E_1$ of FIG. 6A.

For a fuller description of the operation of the conventional Summer-Filter operational amplifier 67 and its feedback networks, reference may be had to the text *Electronic Analog and Hybrid Computers*, by Korn and Korn, McGraw Hill Book Company, 1964, section 1–14, on pages 21 through 27.

Using the calculations for the coefficients $\alpha$ and $\beta$ as well as $k$, from equations (24), (21) and (22) respectively in application to the circuit of FIG. 5 yields the following exemplary values for practical resistors in the circuit:

| | |
|---|---|
| 62: | 10 kΩ |
| 65: | 16.46 kΩ |
| 55 and 56: | 4.44 kΩ |
| 68 and 69: | 4 kΩ |
| 64: | 4.6 kΩ |

These values furnish the correct gains $2\alpha$ (in view of the half-wave nature of the conventional average computation) and $\beta$ for the average of the clipped peaks, plus the correct scale factor $\frac{\pi\sqrt{2}}{4}$ times the output DC $E_7$ for purposes of clipping the input to generate the peaks that are to be averaged and fed back from the harmonic-insensitive output. Thus the implementation of FIG. 5 with the above values for the resistors 62, 65, 55, 56, 68, 69, and 64, reflects the elimination of 0° or in-phase third, fifth, 11th, 13th, and so forth harmonics as hereinbefore described and analyzed via equations (1) through (27). It should be apparent that another set of resistor values would cause the circuit of FIG. 5 to reject effects of other 0° odd harmonics if the specific harmonics to be rejected were inserted into equations (16) and (17) as the symbols $i$ and $j$ respectively, and the corresponding coefficients $\alpha$, $\beta$ and $k$ solved for as hereinbefore described.

Figure 7:
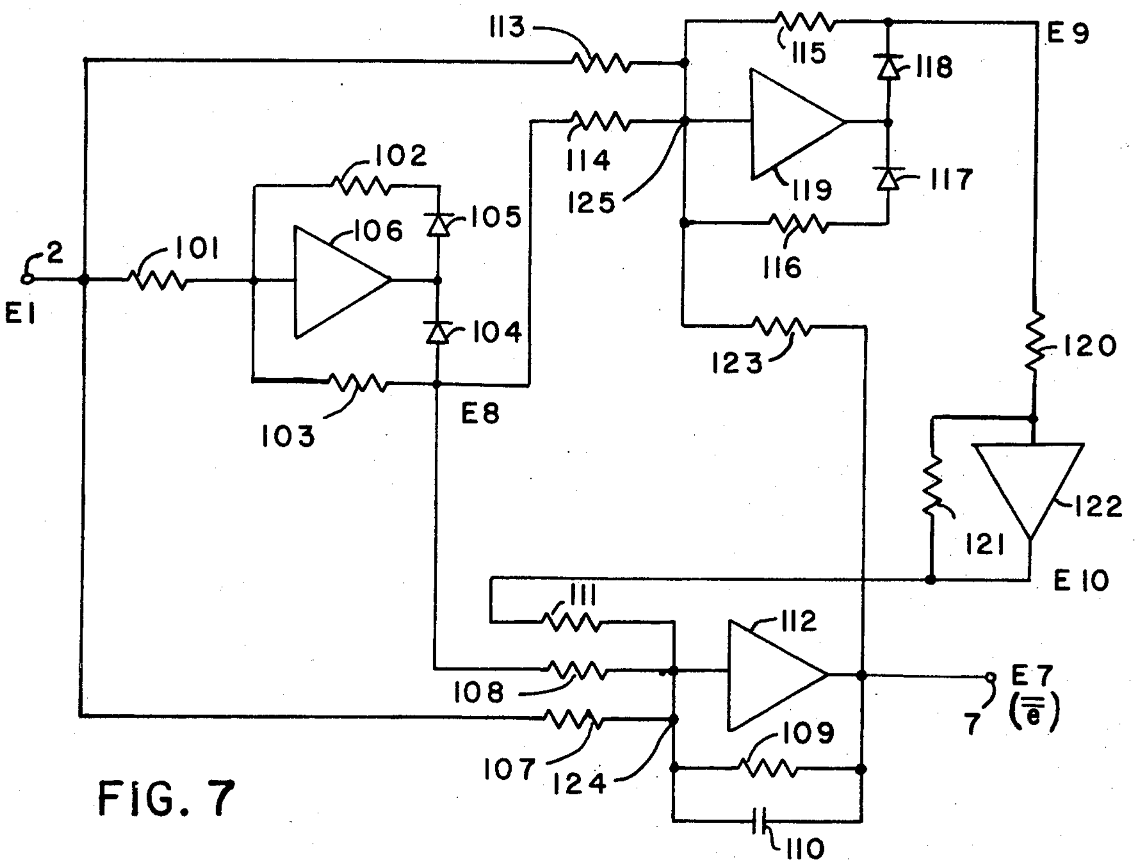
FIG. 7 is a schematic circuit diagram of another form of the embodiment of FIG. 2 in greater detail.

FIG. 7 illustrates in circuit diagrammatic form, a precision embodiment of the block diagram form of the instant invention as represented in FIG. 2, and as shown in a simpler, less accurate implementation in FIG. 5. As in both preceding FIGS. 2 and 5, there are provided in FIG. 7 the Conventional Average-to-DC Converter means 14 of FIG. 2, a Correction Generator which, as with block 13 in FIG. 2, constitutes a Selected-Clipping Level, Peak-Averaging Converter, and a Summer and Filter as in block 6 of FIG. 2. The clipping level is set via feedback from the total, harmonic-insensitive output of the Summer and Filter means, and the various gain coefficients are set as in the foregoing analysis. FIG. 7 merely implements each of the required functions in a manner which is a precision representation, made possible by the high precision state of the analog computational art.

Figure 8:
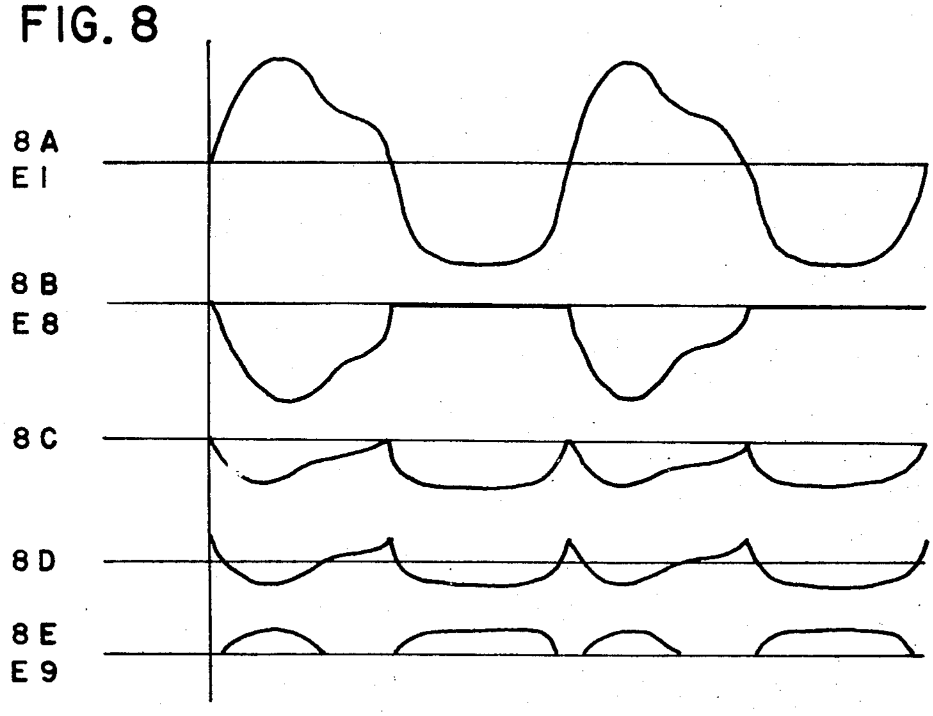
FIG. 8 is a graphical representation of exemplary waveforms of the circuit of FIG. 7.

Specifically with respect to FIG. 7 for the circuit diagram and to FIG. 8 wherein are represented exemplary waveforms of selected points within he circuit of FIG. 7: input $E_1$ (FIG. 8A) is applied to terminal 2. It is a waveform composed of a fundamental and higher harmonic components. It is precision half-wave rectified in the operational rectifier comprising amplifier (inverting) 106, in conjunction with feedback diodes 104 and 105, feedback resistors 102 and 103 and input resistor 101 which is connected to input terminal 2. For a fuller understanding of such precision rectifiers employing operational amplifiers, see the text *Electronics Analog and Hybrid Computers*, Korn and Korn, McGraw Hill Book Company, 1964, chapter 9, pages 344 and 345, as well as 359 and 360.

The half-wave precision rectified output $E_8$ from operational rectifier 106 actually appearing at the junction of diode 104 and resistor 103, is shown as merely the negative portion of the waveform, inverted, of FIG. 8A, namely the input $E_1$, in the waveform of FIG. 8B. Its precision is limited not only by the semiconductor diode 104, but in view of the performance of the operational rectifier as described in the aforementioned reference, only by the fine resistors 101 and 103, and the gain of the amplifier 106 which may be made very high.

Summing $E_8$ with $E_1$ via resistors 108 and 107, with the ohmic value of the latter equal to twice the value of the former (under the assumption that the gain of the operational rectifier was unity—that is, 103 was equal to 101) provides in effect full-wave rectification for the input $E_1$ in the conventional sense, as described in the aforementioned reference on pages 359 and 360. Thus the operational Summer-Filter consisting of input resistors 108 and 107, plus operational amplifier 112 with feedback resistor 109 and feedback filter capacitor 110 (analogous to the Summer and Filter implementation of FIG. 5), would, in the absence of third input resistor 111, furnish to output terminal 7 a potential equal to the DC voltage representative of and proportional to the input AC $E_1$, in a conventional average sense.

Auxiliary operational rectifier comprising operational amplifier 119 with feedback diodes 117 and 118 and feedback resistors 115 and 116, with input resistors 113, 114 and 123, serves as the core of the Correction Generator means for the implementation of FIG. 7. In the absence of input resistor 123 from the DC output $E_7$, the sum of the two inputs, suitably scaled, would appear as in FIG. 8C: specifically for the sum of $E_8$ and $E_1/2$. The value of the resistor 113 will be set double the value of resistor 114 (thereby setting the gain for resistor 113) equal to one-half that of the gain for resistor 114, as is well known to those skilled in the art, and as is covered in the aforementioned reference text).

The feedback output voltage $E_7$ appears however as a third input to operational rectifier amplifier 119, via resistor 123, suitably scaled—in fact, for the case in which third and fifth, as well as 11th, 13th and so on harmonics are to be rejected in their 0° phase representations, multiplied by $\frac{\pi\sqrt{2}}{4}$ as called for in equation (27), and as shown in FIG. 8D. This positive potential biases the full-wave negative rectified potential of FIG. 8C off in the positive direction, leaving only the negative going peaks which exceed the bias potential going below the zero-volt axis. This train of peaks, inverted by the action of inverting amplifier 119, appears as the potential $E_9$ which is the output of the operational rectifier amplifier 119, actually appearing at the junction of feedback diode and resistor 118 and 115 respectively. It is polarity inverted by operational inverting amplifier 122 in conjunction with input and feedback resistors 120 and 121, to become the potential $E_{10}$ which is merely the negative or inverted version of the $E_9$ waveform shown in FIG. 8E. It is applied as the output from the Correction Generator, to the Summer and Filter amplifier 112 via input resistor 111 as shown in FIG. 7. By this means, with the total gain for the conventional average equal to $\alpha$ and the gain for the Correction Generator's output equal to $\alpha\beta$ as required by equation (6), a harmonic-insensitive average value corresponding to the input $E_1$ on terminal 2 is generated as the output $E_7$ on the terminal 7.

Figure 9:
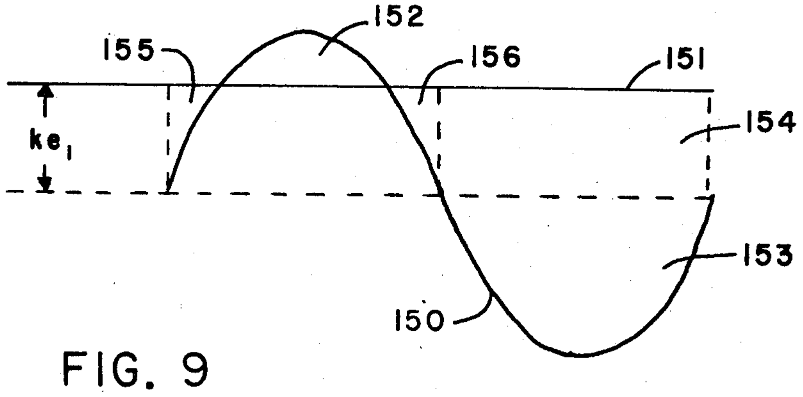
FIG. 9 is a graphical representation of the various waveform sections in an alternate approach to the basic clipping operation.

FIG. 9 shows various waveform sections for a clipping method alternate to that of FIG. 4, as used in the implementations of FIGS. 5 and 7. It is based on the idea that if the clipped peak 152 in FIG. 9 contains a certain harmonic content, then the portions of the wave (sections 155, 156, 153 and 154) that are left when the peak 152 is removed, must by Fourier analysis be the fundamental less the harmonic content of the peak 152, which would be as effective in cancelling the unwanted 0° harmonics in the input wave average conversion as is the peak 152, assuming suitable adjustments have been made in the scale factors or gains involved in the addition of the conventional average to the output from the Correction Generator means 4, say, in FIG. 1, and in the polarity of the output from Correction Generator means 4. The absolute value of the coefficient $\beta$ will remain the same, although its sign becomes negative, while the coefficient $\alpha$ becomes 0.23 approximately, to account for the fact that much more fundamental is contained in the Correction Generator's output for the clipping method of FIG. 9 than for the clipping method of FIG. 4, i.e., in the portion of the wave below the peak-clipping level than in that portion which lies above it. It should be noted that the clipping and averaging must be carried out separately for both normal and inverted polarities for the clipping method of FIG. 9, and the results then added, as opposed to the possibility—included in the embodiments of FIG. 5 and FIG. 7—for the peak clipping method of FIG. 4, of combining in-phase and inverted or 180° out-of-phase clipped waveforms, and then averaging.

Figure 10:
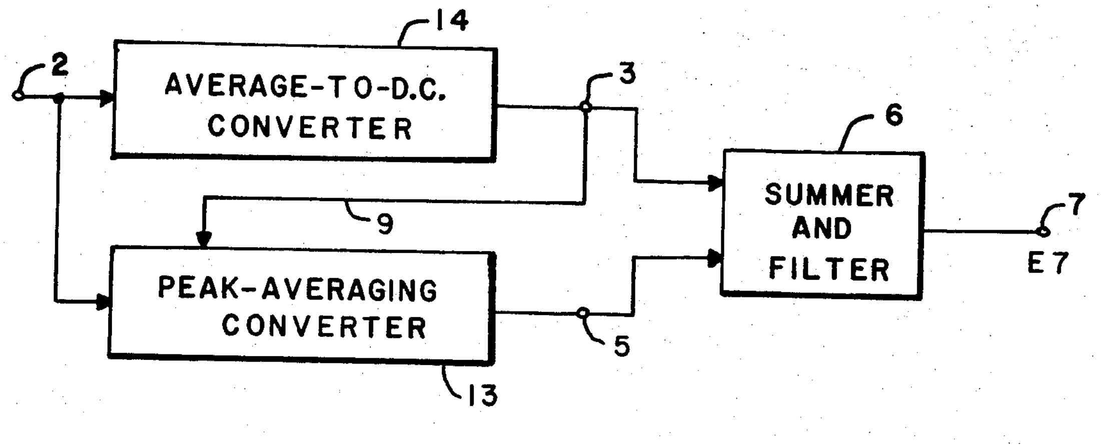
FIG. 10 is a block diagram of a second embodiment of FIG. 1 in greater detail.

Still another alternate embodiment of the block diagram of FIG. 1 is shown in FIG. 10. In it, instead of the clipping level determination being based on the output potential of the entire harmonic-insensitive converter at terminal 7, as the most harmonic-insensitive signal available, the clipping level is rather determined by the output from the Conventional Average-to-DC Converter means 1 appearing at terminal 3, and as transmitted via path 9 as shown in FIG. 10. While the output from the Conventional Average-to-DC Converter is not invariant with 0° odd harmonics as is the output from the total harmonic-invariant conversion system, it may be used when the input distortion is relatively low, and the second-order effects or changes in the output $E_7$ on terminal 7 due to using a non-harmonic-invariant clipping level are small, i.e., in any event smaller than the basic errors or changes due to 0° odd harmonics. The embodiment of FIG. 10 can provide reasonable immunity to off harmonics, greater than that which is available with the Conventional Average-to-DC Converter alone, when it is more convenient to provide the clipping level in an open-loop or nonfeedback manner.

Figure 11A:
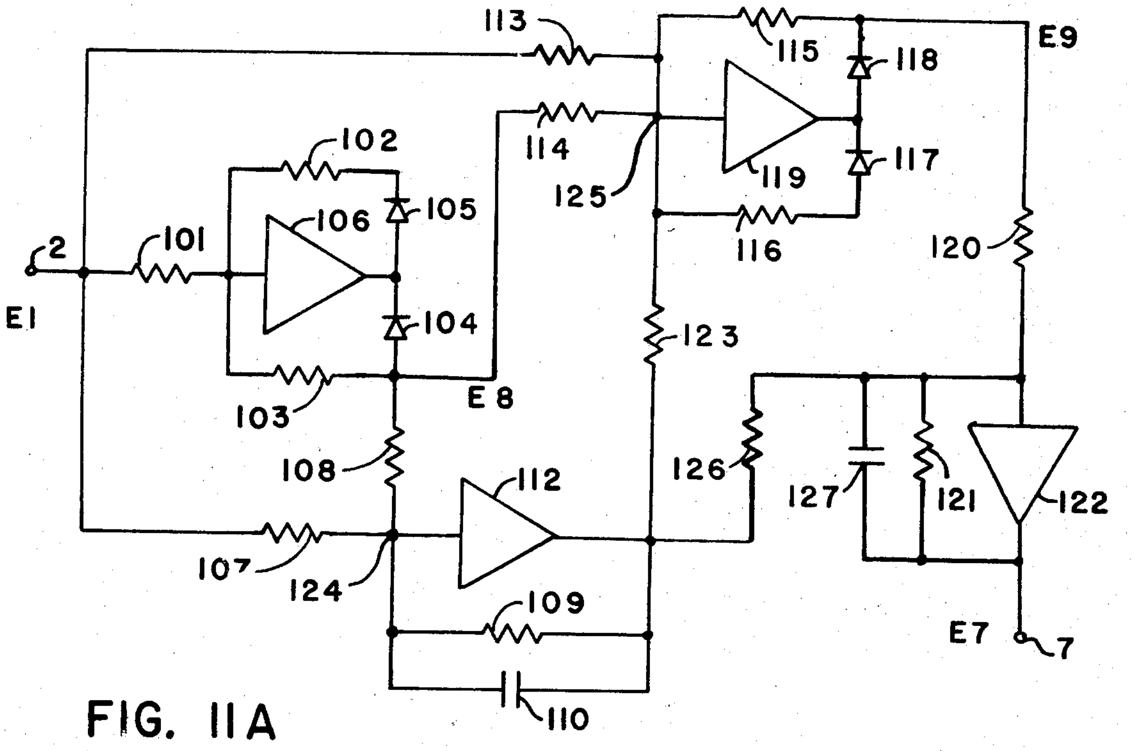
FIG. 11A and 11B are two schematic circuit diagrams of embodiments of FIG. 10 in detail.

FIG. 11A is a precision converter schematic diagram using the basic building block computing elements—operational rectifiers and operational Summers and Filters—of FIG. 7, but reflecting the basic embodiment of FIG. 10 instead of that of FIG. 2. FIG. 11A is thus like FIG. 7 in all respects save: elimination of the feedback path from output of amplifier 122 via resistor 111 in FIG. 7, addition of forward DC path from the output of amplifier 112 to the input of amplifier 122 via resistor 126, and transfer of output terminal 7 from the output of amplifier 112 to the output of amplifier 122; as well as the addition of feedback capacitor 127 in parallel with feedback resistor 121, around amplifier 122.

Operational rectifier amplifier 106 functions as in FIG. 7, to furnish amplifier 112 with a conventional average version of the input $E_1$ applied to terminal 1. However, there is no auxiliary input to amplifier 112, so that its output is now the conventional average. The latter is furnished via resistor 123 as before to amplifier 119 to supply the clipping level for the correction generator peak-averaging computation, and the output of that computation is furnished to amplifier 122 as in FIG. 7. However, 122 has become a Summer and Filter by virtue of the addition of feedback capacitor 127 and additional input resistor 126 from the output of amplifier 112, so that its output is now the combined or composite output of the harmonic-insensitive average converter embodiment of FIG. 10.

Figure 11B:
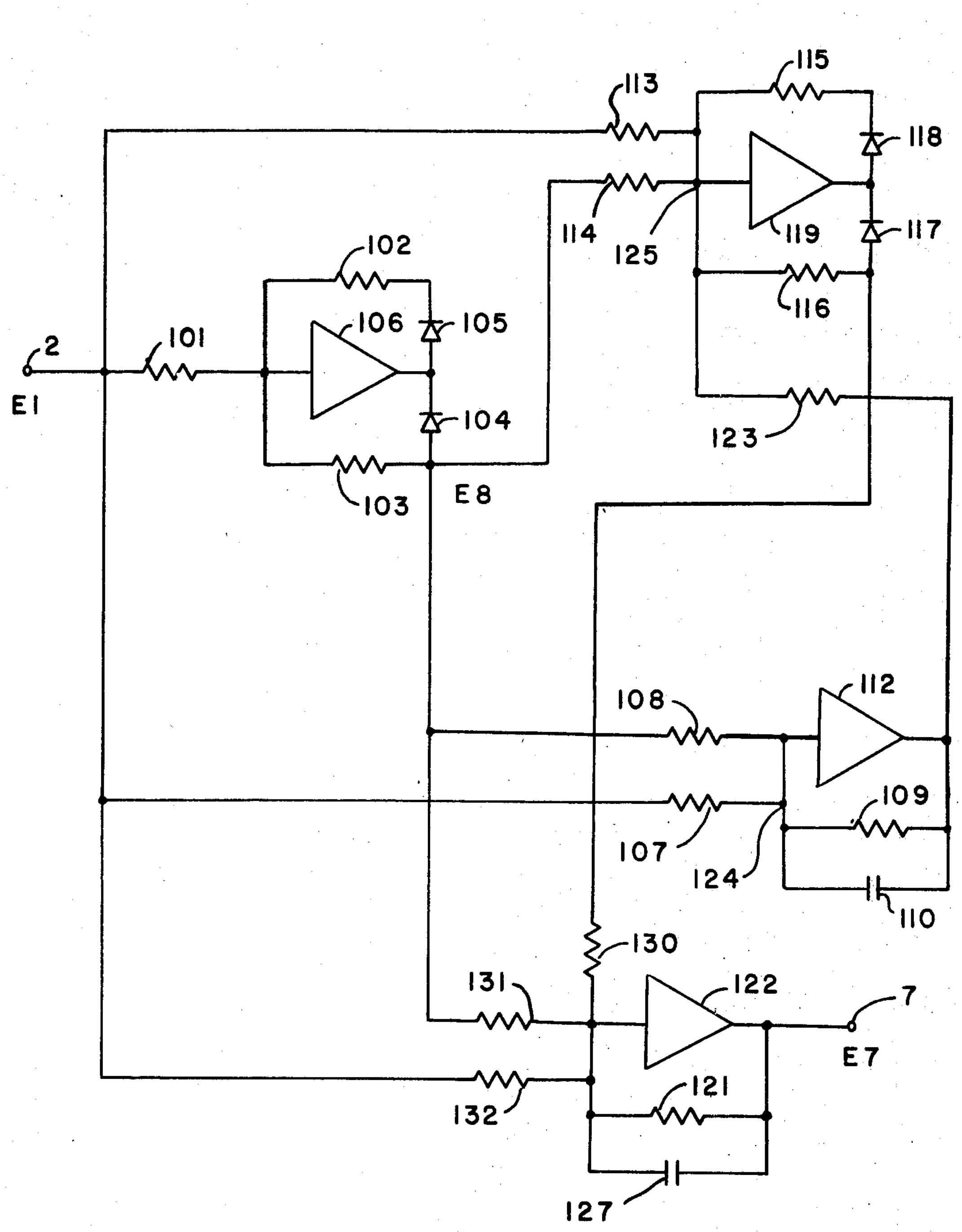

Still another alternate embodiment, depicted in FIG. 11B, first takes the absolute value of the input—resulting in a full-wave rectified signal such as that of FIG. 8C—and then takes what remains after the peaks have been removed, rather than using the peaks themselves, for the Correction Generator's output, employing the clipping level or selected level as a new zero line: i.e., the portion above rather than below the 0 axis in FIG. 8D. This method, applied specifically to FIG. 11A for example, results in FIG. 11B by eliminating resistor 120 connecting the junction of diode 118 and resistor 115 to the input of amplifier 122, as well as the other resistor 126 furnishing the output of amplifier 112 as a second input to amplifier 122, in FIG. 11A; and adding input resistors 130, 131, and 132 to amplifier 122, from the junction of diode 117 and resistor 116 at the output network of amplifier 119, from the junction of diode 104 and resistor 103 at the output network of amplifier 106, and from the input terminal 2 respectively. Resistors 131 and 132 thus furnish amplifier 122 with a negative, full-wave rectified conventional average signal. Resistor 130 furnishes amplifier 122 with the negative peaks as described above, essentially as shown in the positive (i.e., above the zero axis) portion of FIG. 8D, but opposite in polarity. For cancellation of third and fifth 0° harmonics, $\beta$ is 3.42 and $\alpha$ is 0.592 very nearly, while $k$ remains $\sqrt{2}/2$. This nonfeedback embodiment, of course, as hereinbefore mentioned, has the limitations that the selected clipping level is not totally invariant with distortion, hence the harmonic rejection while good, is imperfect even theoretically; however it is a useful embodiment in some applications.

Other embodiments, involving clipping out segments, for example, rather than peaks of the input waveform, may also be constructed to advantage.

Figure 12:
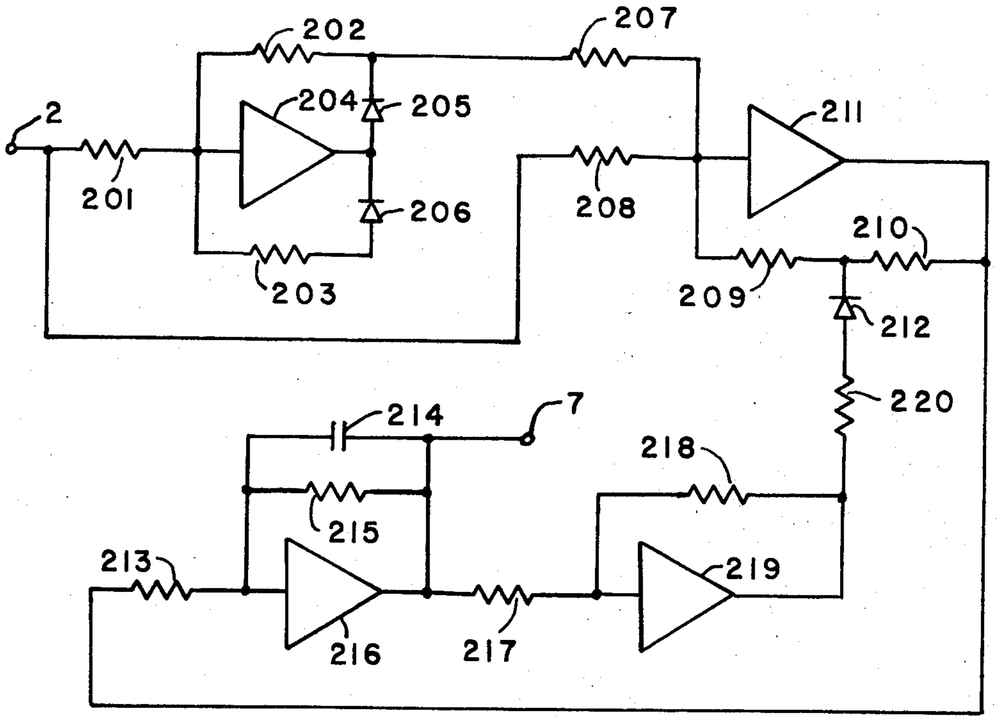
FIG. 12 is a schematic circuit diagram of an embodiment of FIG. 2 alternate to that of FIG. 7.

FIG. 12 shows an embodiment of the basic block diagram of FIG. 2 of instant invention, alternate to that of FIG. 7. It employs the operational rectifiers and Summer-Filter embodiments of FIG. 7, but in a different configuration to demonstrate yet another approach to the generation of the correction and addition of the correction to the basic average.

Specifically, instead of obtaining a separate representation for the average value of the clipped peaks of the input waveform and adding it to the conventional average, the embodiment of FIG. 12 accomplishes similar results by enhancing the gain of the conventional-averaging channel after the input wave has reached the peak value at which the feedback DC is to start clipping. This enhancement is in an amount which provides the correct coefficient $\beta$ as before. Amplifier 204 functions with its feedback elements as an operational rectifier, as hereinbefore described for other Figures. Thus, the sum of the signals applied to resistors 207 and 208, inputs to the amplifier 211, is essentially a full-wave representation of the rectified input, like FIG. 8C, but with positive-going wave segments instead of negative-going wave-segments since the opposite polarity is taken rather from the operational rectifier in FIG. 12 than was the case in FIG. 7 (i.e., from the junction of diode 205 and resistor 202, diode 205 being poled oppositely from diode 104 in FIG. 7). The feedback path for amplifier 211 is split into two resistors, 209 and 210. For output potentials from amplifier 211 for which the potential at the junction of resistors 209 and 210 is less negative than the potential at the output of amplifier 219, diode 212 connected to the junction of 209 and 210 will not conduct. When the peaks of the waves at the junction of resistors 209 and 210 exceed (in a negative sense) the DC potential at the output of amplifier 219 which is biasing diode 212 via resistor 220, diode 212 will conduct and increase the forward gain of the feedback amplifier 211, by an amount determined by the ratios of resistors 209, 210 and 220. The output of amplifier 211 is furnished to filtering amplifier 216 with feedback resistor-capacitor combination 215, 214 which supplies output terminal 7, and also supplies inverting amplifier 219 with its input and feedback resistors 217 and 218, to furnish the correct polarity clipping voltage to the diode 212 for gain enhancement of the peaks of the input signal as hereinbefore described. While the specific embodiment of FIG. 12 employs certain techniques and computing elements and components, it should be apparent to those skilled in the art that other combinations of components and elements in different configurations may be employed to obtain gain enhancement for the peaks above $ke_1$, in a system in which the correction generating means and the adding means and the adding means (for adding conventional and correction converter outputs) are combined in a single computation.

Figure 13:
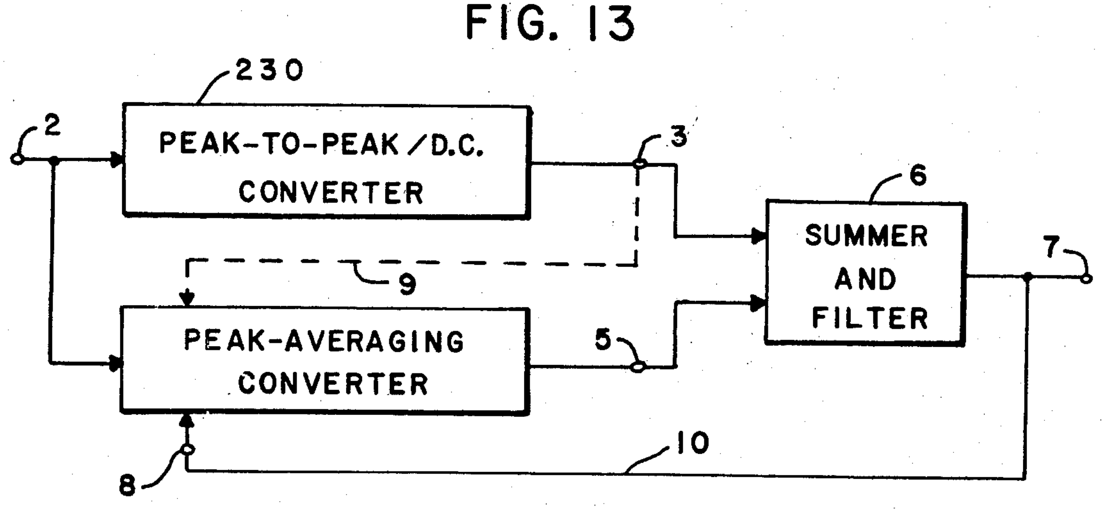
FIG. 13 is a block diagram of yet another embodiment of the invention, alternate to FIG. 2.
Figure 14:
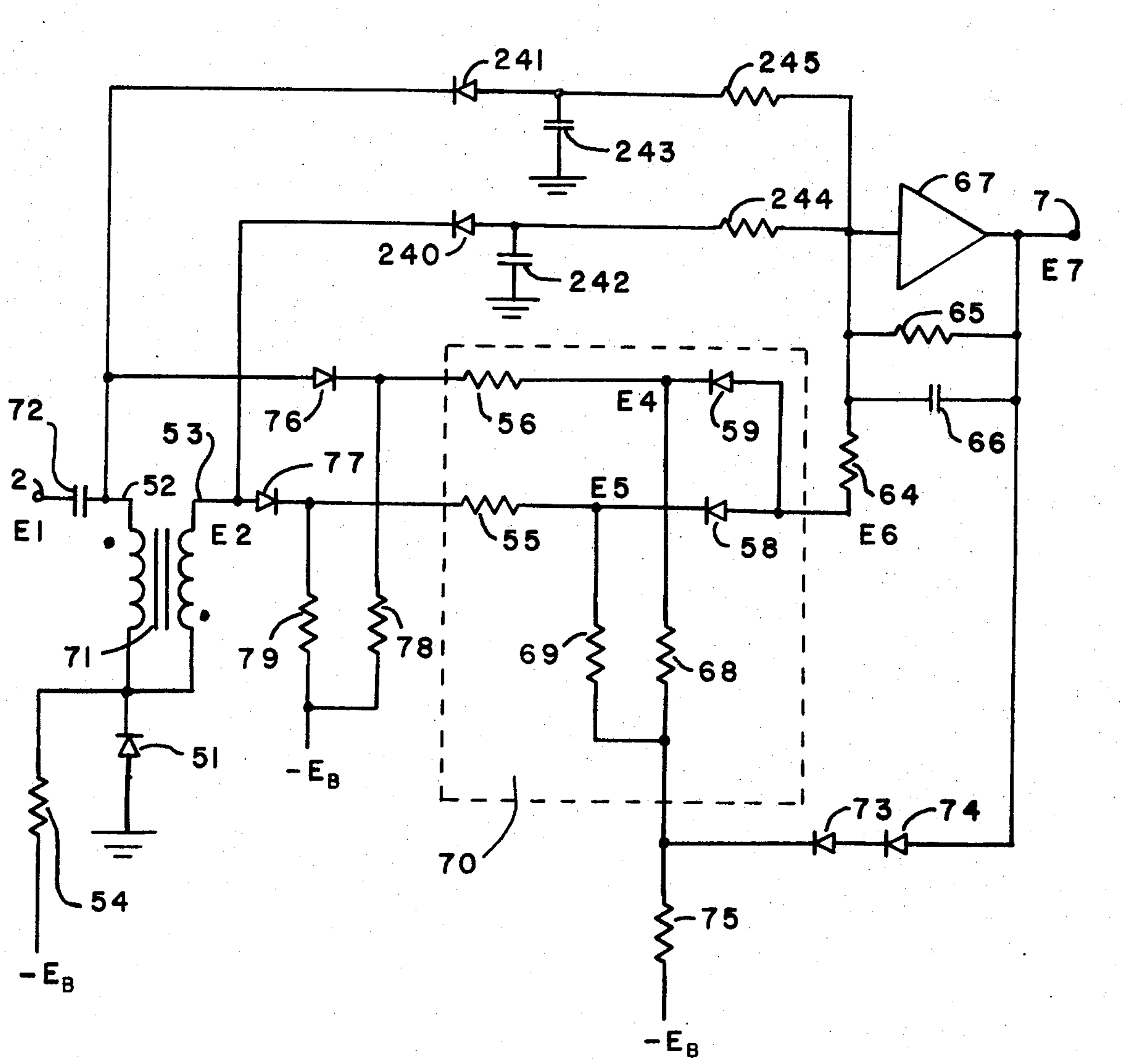
FIG. 14 is a schematic circuit diagram exemplary of the embodiment of FIG. 13.
Figure 15:
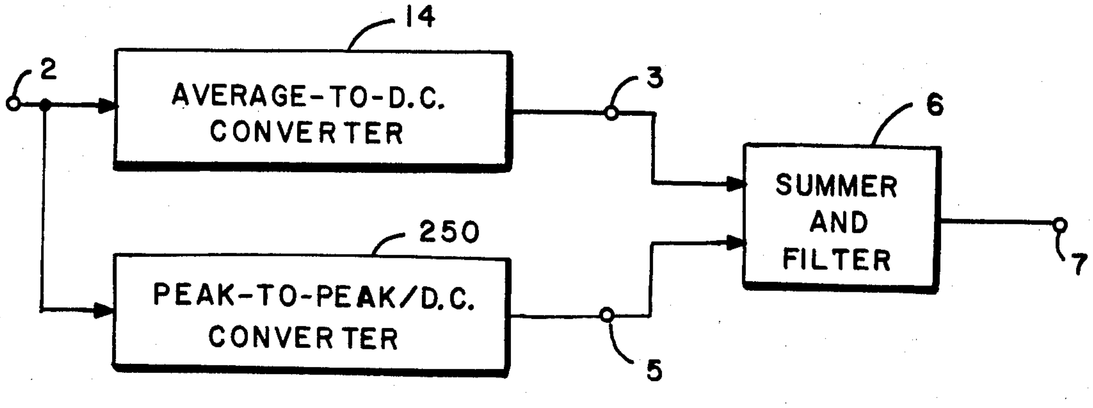
FIG. 15 is a block diagram of yet another embodiment of the invention, alternate to FIG. 2.
Figure 16:
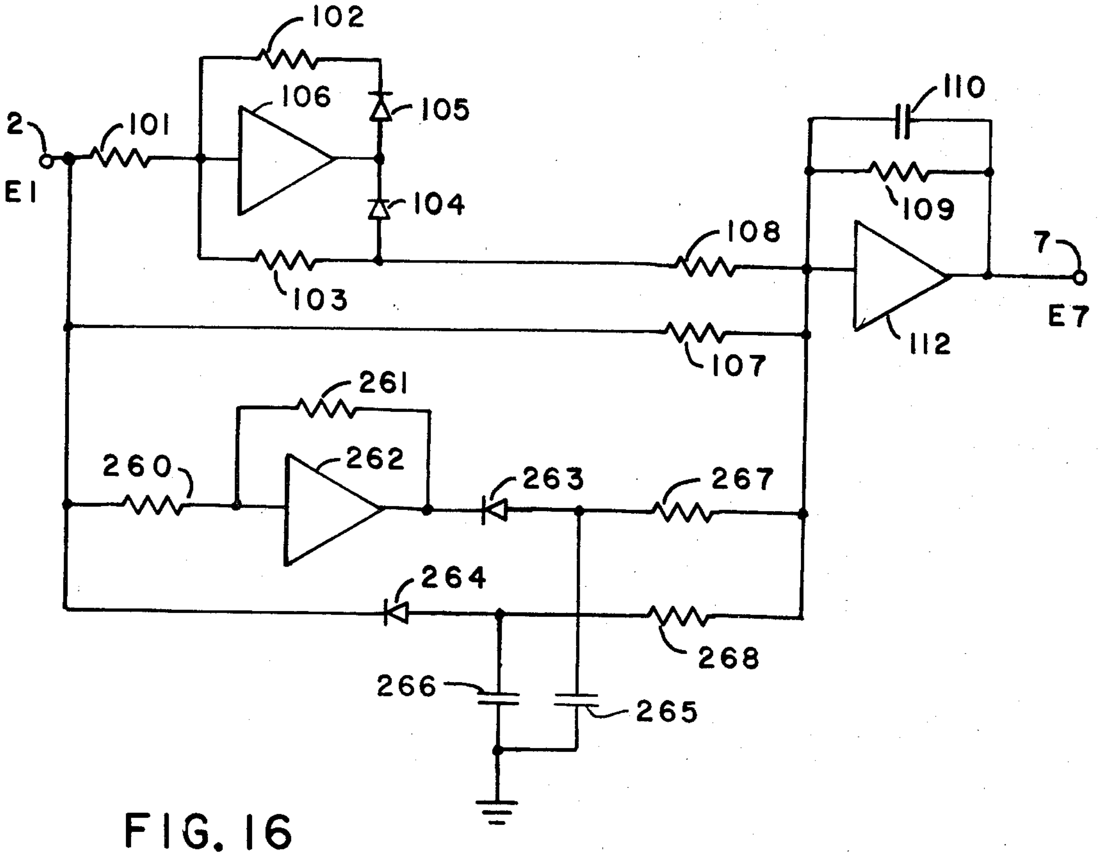
FIG. 16 is a schematic diagram of a specific example of the embodiment of FIG. 15.

Two other specific embodiments of the instant invention depicted in FIG. 1 constitute additional examples. The first, represented in FIGS. 13 and 14, illustrates use of the Peak-Averaging Converter for the Correction Generator in conjunction with a Conventional Peak-to-Peak/DC Converter for the principal AC-to-DC Conversion, as opposed to the Average-to-DC Converter employed for the Conventional AC-to-DC Converter in the preceding examples of FIG. 1. The second, illustrates use of a Peak-to-Peak/DC Converter for the Correction Generator, while retaining the Conventional Average-to-DC Converter for the principal AC-to-DC Conversion, and is represented in FIGS. 15 and 16.

Referring now to FIG. 13, which illustrates the specific embodiment by a simple block diagram, it will be seen that the implementation is identical with that of FIG. 2 with two exceptions: the change from the Conventional Average-to-DC Converter means 14 in FIG. 2 to a Conventional Peak-to-Peak/DC Converter means 230 in FIG. 13, and the addition of dotted line 9 in FIG. 13, as in FIG. 1, to indicate that the feedback, clipping level applied to the Peak-Averaging Correction Generator means 13 may be derived, as in the previous embodiments, either in a feedback sense from the harmonic-insensitive output $E_7$ on terminal 7 (via path 10), or in an open-loop or nonfeedback way from the output of the Conventional AC-to-DC Converter 230 appearing at terminal 3 as in FIGS. 1 and 2.

Inspection of the waveforms of FIGS. 3A through 3J shows that Peak-to-DC Conversion is essentially insensitive to all harmonics except 0° odd and 90° even harmonics, which indeed influence the peak values of the wave composed of a fundamental and these harmonics in an additive sense. However, positive and negative peaks of the composite wave are affected in an opposite sense by the 90° even harmonics—that is, a 90° second harmonic for example decreases the amplitude of the first fundamental peak when the two are added, while it increases the amplitude (negative in this case) of the second fundamental peak. Thus a Peak-to-Peak/DC Conversion is insensitive to the 90° even harmonics, leaving only sensitivity to the same harmonics to which the average value of the input wave responds, namely only the 0° odd harmonics, for small to medium harmonic content. Sensitivity in the case of the Peak-to-Peak/DC Conversion, however, is not an inverse function of the harmonic number (see equation 5) as for the Average-to-DC Conversion; rather, the peaks of the 0° odd harmonics add directly to the peaks of the fundamental, regardless of the harmonic number.

Thus the output of the Peak-to-Peak/DC Converter means 230 in FIG. 13, $E_{PP}$, for a given harmonic contaminant $e_n$ superimposed of the input fundamental $e_1$ (where both are representative of the peak values of their respective waves), is:

$$E_{PP}=2e_1+2e_n \qquad (28)$$

while from dividing equation (3) by $\pi$ to convert area to average value over the half-period, as already described in connection with equations (4) and (5), the DC output of Correction Generator means 13 is:

$$E_{Pk\text{-}Avg}=\frac{1}{\pi}\left(2e_1\cos\theta_1-ke_1(\pi-\theta_1)+\frac{2e_n}{\nu}\cos n\theta_1\right) \qquad (29)$$

Combining the outputs of the two converters as before (as at equation (6)), with overall scale factor $\alpha$ and Correction Generator scale factor $\beta$ as before, the total DC output from the Summer and Filter, $E_7$ will be:

$$E_7=\alpha(E_{PP}+\beta E_{Pk\text{-}Avg}) \qquad (30)$$

Substituting the values of $E_{PP}$ and $E_{Pk\text{-}avg}$ into equation (30) as they are set forth in equations (28) and (29) respectively, and collecting terms, $$E_7 = e_1\left(2\alpha + \frac{2\alpha\beta}{\pi}\cos\theta_1 - \frac{\alpha\beta k}{\pi}(\pi-\theta_1)\right) + e_n\left(2\alpha + \frac{2\alpha\beta}{\pi n}\cos n\theta_1\right) \quad (31)$$

Setting the coefficient of $e_n$ to zero to obtain zero sensitivity to the $n$th harmonic, $$1+\beta/\pi n)\cos n\theta_1 = 0 \quad (32)$$

Letting equation (32) hold for $n$=3 and $n$=5 simultaneously, $$1+(\beta/3\pi)\cos 3\theta_1=0 \quad (33)$$

and $1+\beta/5\pi)\cos 5\theta_1=0$ (34)

Equations (33) and (34) may be rewritten:

$$1/3\cos 3\theta_1=-\pi/\beta \quad (35)$$

$$1/5\cos 5\theta_1=-\pi/\beta \quad (36)$$

A numerical solution for equations (35) and (36) simultaneously, recognizing as in the case of equation (11) that $3\theta_1$ is in quadrant II and $5\theta_1$ is in quadrant III for the same reasons given in connection with the analysis at equation (11), yields $\theta_1$=41° very nearly, $\beta$=17.3 and $k$=sin 41°=0.655.

Referring now to FIG. 14, there is shown therein a schematic diagram embodying the invention as implemented in the block diagram of FIG. 13. The Correction Generator is the same, biased full-wave peak-averaging converter described in connection with FIG. 5: namely the inverter transformer 71, resistor dividers 56–68 and 55–69, diodes 59 and 58, and associated other components as described in connection with FIG. 5. However, the conventional averaging diode-resistor combination 60 and 61 from FIG. 5, is replaced in FIG. 14 with a peak-to-peak computing circuit composed of diode 241 and capacitor 243 for negative input peaks, and diode 240 and capacitor 242 for positive input peaks, which are inverted to become negative peaks via the inverting action of transformer 71 as hereinbefore described. The sum of the potentials, both negative at the high ends of capacitors 242 and 243 represents the peak-to-peak value of the AC input potential. That sum is taken by applying the potentials respectively to input resistors 245 and 244 of Summer-Filter amplifier 67, whose third input is applied (as in FIG. 5) from resistor 64, deriving from the output of the Peak-Averaging Converter (at the common anode junction of diodes 58 and 59). The operation of Summer-Filter 67 with its feedback resistor 65 and feedback, filter capacitor 66 is as described hereinbefore, and the action of the feedback path from the output of 67 on terminal 7 to the biasing resistors 68 and 69 is also as hereinbefore described.

Referring now to FIG. 15, there is shown a block diagram of a simple embodiment of instant invention. As mentioned hereinbefore, it illustrates use of a Conventional Average-to-DC Converter means 14 as in FIG. 2, but employs a Peak-to-Peak Converter means 250 as the Correction Generator, whose output is summed as before with that of the Average Converter means 14, in the Summer and Filter 6. The output 7 of the latter is the total output of the harmonic-insensitive converter. In this instance, no auxiliary DC signal is required for the Correction Generator. Hence, neither path 9 or path 10 from FIG. 1 is included, although an additional DC input, feedback or otherwise, could be employed without loss of generality.

The output DC from Average Converter means 14 in FIG. 15 is given in equation (5), repeated as:

$$E_{Avg} = \frac{1}{\pi}\left(2e_1 + \frac{2e_n}{n}\right) \quad (37)$$

while equation (28) gives the relation for $E_{PP}$, the Peak-to-Peak Converted to DC value at the output of Correction Generator means 250. Again the sum is taken (in this case of equations (37) and (28)) in Summer and Filter means 6, to obtain the output $E_7$ at output terminal 7:

$$E_7=\alpha(e_{Avg}+\beta E_{PP}) \quad (38)$$

Substituting the expressions for $E_{Avg}$ and $E_{PP}$ from equations (37) and (28) respectively into equation (38) and collecting terms, $$E_7=e_1\left(\frac{2\alpha}{\pi}+2\alpha\beta\right)+e_n\left(\frac{2\alpha}{\pi n}+2\alpha\beta\right)$$

Setting the coefficient of $e_n$ to zero, and solving for $\beta$, yields:

$$\beta=-1/\pi n$$

Thus for $\beta$ equal to $-1/3\pi$ or $-1/5\pi$, for example, either third or fifth 0° harmonic may be cancelled completely, but the two may not be cancelled simultaneously with this method. However, an excellent compromise may be made to effect good if not perfect cancellation of both, or of any two 0° odd harmonics, as follows: $n$th harmonic ratio to fundamental, designated $H_n$, may be found from equation (39) for the general case, as the ratio of the coefficients for $e_n$ and $e_1$:

$$H_n=\left(\frac{2\alpha}{\pi n}+2\alpha\beta\right)/\left(\frac{2\alpha}{\pi}+2\alpha\beta\right) \quad (41)$$

which reduces to:

$$H_n=(1/\pi n+\beta)/(1/\pi+\beta) \quad (42)$$

A compromise value for $\beta$ that rejects most of the third and fifth 0° harmonics may be found if the desired ratio of third and fifth ratios to fundamental, $H_3/H_5$, is selected. For equal and opposite polarity ratios, or the same absolute sensitivity to third as fifth but with opposite signs, $H_3=-H_5$, equation (42) yields $$(1/3\pi+\beta)=-(1/5\pi az\beta) \quad (43)$$

From which:

$$\beta=-4/15\pi \quad (44)$$

in which case $H_3$ and $H_5$, from equation (42), are 1/11 and −1/11 respectively instead of 1/3 and 1/5 respectively (from equation (5) with $n$=3 and 5).

Referring now to FIG. 16, there will be seen a specific embodiment of the block diagram of FIG. 15, in which the Conventional Average-to-DC Converter is the same as for FIG. 7; namely, operational amplifiers 106 and 112 with their associated input and feedback networks, as described in connection with the aforementioned FIG. 7.

In FIG. 16, however, instead of the Peak-Averaging Converter (amplifiers 119 and 122 in FIG. 7, with associated input and feedback networks), a Peak-to-Peak Converter is substituted as in FIG. 15. Specifically, the input $E_1$ is inverted by amplifier 262 with associated input resistor 260 and feedback resistor 261; and both the input $E_1$ and inverted input at the output of amplifier 262 are applied to peak-to-DC circuits consisting of diode 264 and capacitor 266 for the input $E_1$, and diode 263 and capacitor 265 for the inverted input. This circuit is very similar to the peak-to-peak computing circuit of FIG. 14 (diodes 240 and 241, capacitors 242 and 243 in that case). Outputs of the capacitors—the peaks or the negative and positive maxima of the input, but both negative at this point in DC polarity for purposes of addition—are added via input resistors 267 and 268 of Summer-Filter amplifier 112, to the output of the Average Converter, to generate the total output $E_7$ from the harmonic-insensitive converter embodiment of FIG. 15 as shown explicitly in one implementation in FIG. 16.

Two additional embodiments of the present invention require perhaps the simplest complement of components.

Performance of the new embodiments may be best understood by reference to FIG. 5. Both of the new embodiments dispense with the requirement for both polarities of input signal, however, so that the input transformer of FIG. 5 (or the inverting amplifier that might be used to replace it) is no longer required. Also, the biasing diodes (51, 76, 77, 73 and 74 in FIG. 5) with their associated resistors (54, 78, 79 and 75) are not included in the new embodiments, since they are not crucial to the invention itself, merely removing a small error that would otherwise arise due to the diode drops in the various rectifier circuits involved.

Specifically, the two new embodiments have push-pull outputs, i.e., the required averages are constructed on a half-wave basis, and then two half-wave averages combined to obtain the equivalent of a full-wave average. Combination of the two half-wave averages is effected by taking the difference between them. The simplest way to effect this is to take an output between them, i.e., to connect a meter or other utilization device directly between them, as will be shown explicitly in the two additional embodiments. However, it should be clear that an explicit subtraction, or employment of a utilization device which is essentially full-wave in input character, can have the same effect.

Figure 17:
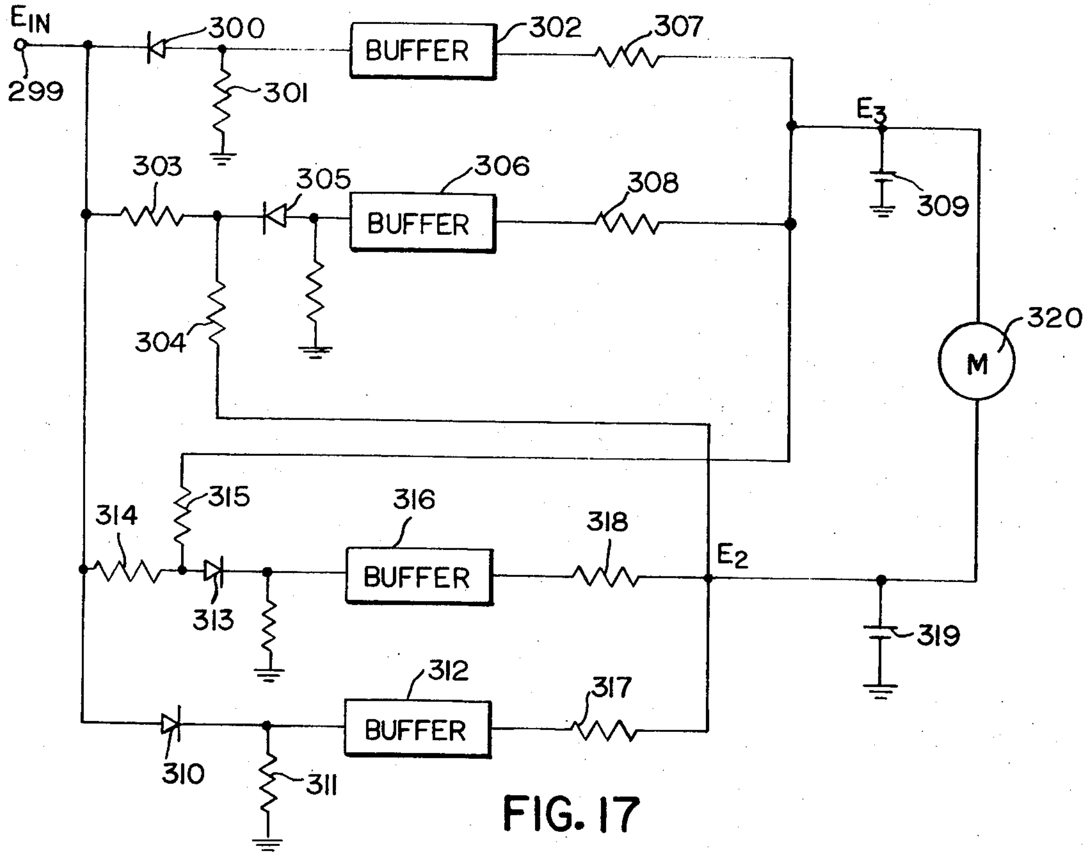
FIG. 17 is a schematic diagram of another embodiment of the invention.

With reference now to FIG. 17, there is shown one of the additional embodiments in which the selected DC clipping potentials are cross-coupled from the outputs of two half-wave, "harmonic-insensitive" averaging devices. The input AC $E_{IN}$ is applied to terminal 299 which is connected through diode 300 and associated resistor 301 to ground. Diode 300 and resistor 301 provide at their junction, a negative half-wave conventional average which is applied to unity gain buffer 302 which has a high input and low output impedance. At the same time, $E_{IN}$ is applied to a voltage divider formed of resistors 303 and 304 whose junction is connected to diode 305. Under the assumption that a voltage $E_2$ derived from the output of a positive, halfwave averaging device properly biases resistor 304 so that the correct clipping level is established for diode 305, the sum of the DC components of the outputs of diodes 300 and 305 will yield a half-wave harmonic insensitive average. As discussed hereinbefore in detail, such a half-wave average will not retain the basic insensitivity of the conventional (either half- or full-wave) average to even harmonics of 90° phase shift with respect to the fundamental. Unity-gain, high input and low output impedance amplifier 306 buffers the output of diode 305. The outputs of buffer amplifiers 302 and 306 are summed via respective resistors 307 and 308 and the resulting sum $E_3$ filtered by capacitor 309.

In an analogous manner, a positive half-wave harmonic insensitive average is computed by conventional half-wave rectifying diode 310 and resistor 311, the junction of which feeds unity gain buffer 312, and biased diode 313 having the voltage divider of resistors 314 and 315 disposed to set the bias level on diode 313 in terms of the summed output $E_3$ from buffers 302 and 306. The output of diode 313 is applied to buffer 316. Summation of the outputs of amplifiers 312 and 316 is effected through resistors 317 and 318 and filtered by capacitor 319. The total output of the device is then taken between $E_2$ and $E_3$ as by meter 320 connected between the summing output terminals connected to the buffer amplifiers.

The buffer amplifiers can simply be emitter-followers or the like. If desired, a diode can be added in series with the output of such an emitter-follower to cancel the drop through the base-emitter junction of the latter. A more elaborate buffer can be formed from an operational amplifier, as well known in the art.

Figure 18:
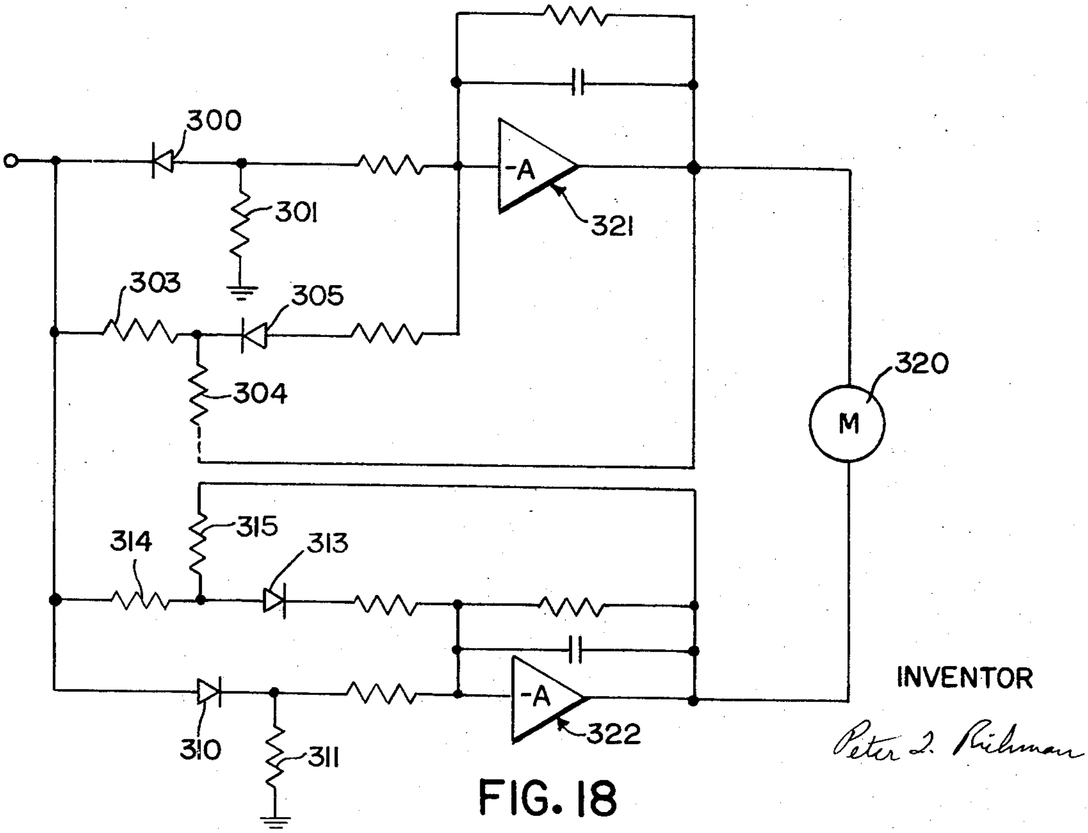
FIG. 18 is a schematic diagram of a modification of the embodiment of FIG. 17.

FIG. 18 shows yet another simple embodiment of the invention quite similar to that of FIG. 17, like numerals denoting like parts. It will be seen that the input rectifying circuits are almost the same, the difference being that the bias potentials applied to resistors 304 and 315 are not derived from cross-coupling. Here the outputs of the conventional averaging device and of the correction generator, exemplified by the outputs from diodes 300 and 305, are summed at the input of operational amplifier 321 which has the usual inverting amplifier stage to provide negative feedback. Hence the output of amplifier 321, being inverted, is connected to provide the desired clipping level to resistors 304. Similarly, the outputs of diodes 313 and 310, applied through the usual input resistors, are summed at the input summing junction of operational amplifier 322. The output of the latter is connected to provide the requisite bias to resistor 315. Again, the outputs of the two amplifiers, one positive the other negative, are applied across meter 320 to get the total output differentially.

While preferred embodiments of the invention are illustrated in the drawings and have been described herein, modifications which do not depart from the essence of the invention may be made and, indeed, are apparent to those knowledgeable in electronic circuitry. Therefore, it is intended that the invention not be limited by the precise structures which are illustrated, but rather that the scope of the invention be construed in accordance with the appended claims.

What is claimed is:

1. A system for converging a time-varying, periodic, complex electrical input wave to DC, and comprising in combination:
 a first full wave AC-to-DC converter, and
 means for selectively altering the gain of said converter between predetermined phase angles with respect to the fundamental of said wave responsively to a feedback signal determined by said DC so that said gain is at a different value between said angles than outside of said angles, whereby the effect of harmonically related distortion components of said wave on the output of said converter is reduced.

2. A system as defined in claim 1 wherein said angles are selected in accordance with the order of the harmonics, the effect of which is to be reduced.

3. A system as defined in claim 2 wherein said angles are about $(2n-1)\pi/4$, $n$ being successive natural, positive integers, the gain for successive segments between each pair of angles being in the ratio of substantially $\frac{1+\sqrt{2}}{1}$ where the numerator is the relative gain for a segment following an angle where $n$ is even and the denominator is the relative gain for the segment following an angle where $n$ is odd.

4. A system as defined in claim 2 wherein said angles are determined in accordance with points of intersection in time of the absolute value of said input wave with a DC level derived from said system or a portion thereof.

5. A system for converting a time-varying periodic complex electric input wave to DC, and comprising in combination:
 a first AC-to-DC converter adapted for providing an output responsively to the absolute average value of portions of the absolute instantaneous value of said wave in excess of a DC level;
 a second AC-to-DC converter having a characteristic sensitivity to harmonically related distortion components of said wave different from the characteristic sensitivity of said first converter to said components;
 a plurality of signal weighting means connected to the outputs of said converters; and
 means for summing the weighted signals from each converter, said DC level being derived from one of the outputs of said system or of said one of said converters.

6. A system as defined in claim 5 wherein said DC level is established at about $\frac{\sqrt{2}}{2}$ times the absolute peak value of the fundamental of said wave.

7. A system as defined in claim 5 in which said second converter is adapted for providing an output responsively to the peak-to-peak value of said wave.

8. A system as defined in claim 7 wherein said DC level is established at about sin 41° times the absolute peak value of the fundamental of said wave.

9. A system as defined in claim 5 in which both of said converters are substantially responsive only to said fundamental and to said components, the harmonic numbers of which are odd and which are in 0° or 180° phase relationship with said fundamental.

10. A system as defined in claim 5 wherein said first converter comprises a high gain amplifier having a pair of feedback paths, a first unidirectional current conducting means in one of said paths for permitting current flow only during positive excursions of said input wave, a second unidirectional current conducting means in the other of said paths for permitting current flow only during negative excursions of said input wave, respective load impedances in each of said paths, and means for deriving a unipolar output signal from across the load impedance in at least one of said paths.

11. A system as defined in claim 5 wherein said first converter comprises a high-gain amplifier having a pair of feedback paths, a first unidirectional current conducting means in one of said paths for permitting current flow only during positive excursions of said input wave, a second unidirectional current conducting means in the other of said paths for permitting current flow only during negative excursions of said input wave, respective load impedances in each of said paths, means for deriving a unipolar output signal from across the load impedance in at least one of said paths, and a summing junction at the input of said amplifier;

means connecting the output of said first converter to said summing junction; and means for deriving a DC level from one of the outputs of said system or of said first converter and for applying said DC level to said summing junction.

12. A system as defined in claim 5 wherein said second converter comprises a pair of diodes with respective like electrodes coupled to one another, the other respective like electrodes of said diodes being connected to be respectively driven in response to peaks of opposite polarity of said input wave, resistive attenuator means for biasing said peaks and each including a series resistance connected between the source of said input wave and the respective other electrode of the corresponding diode and a shunt resistance connected between said respective other electrode and a reference terminal adapted to be connected to a source of biasing DC potential, and means connecting the output of said summing means to said reference terminal.

13. A system as defined in claim 12 wherein said first converter comprises a diode connected to be driven in response to one polarity of said input wave.

14. A system as defined in claim 12 wherein said first converter comprises another pair of diodes with respective like electrodes coupled to one another, the other respective like electrodes of said another pair being connected to be driven in response to peaks of opposite polarity of said input wave.

15. A system as defined in claim 5 wherein one of said converters is responsive to the full-wave absolute value of said input wave, and the other of said converters is integral with said means for summing.

16. A system as defined in claim 5 wherein:

said first converter comprises first and second diodes having one pair of opposite electrodes connected to one another and to the source of said input wave;

said second converter comprising first and second voltage dividers each having an input connected to said source;

third and fourth diodes, the outputs of said first and second dividers being respectively connected to the anode of said third diode and the cathode of said fourth diode;

means for summing and filtering the output of said third and first diodes through appropriate ones of said weighting means;

means for summing and filtering the outputs of the second and fourth diodes through appropriate ones of said weighting means;

means connecting the summed, filtered output of said third and first diodes for biasing said fourth diode through a portion of said second divider;

means connecting the summed, filtered output of said second and fourth diodes for biasing said third diode through a portion of said first divider; and means for determining the difference between said summed outputs.

17. A system as defined in claim 5 wherein:

said first converter comprises first and second diodes having one pair of opposite electrodes connected to one another and to the source of said input wave;

said second converter comprising first and second voltage dividers each having an input connected to said source;

third and fourth diodes, the outputs of said first and second dividers being respectively connected to the anode of said third diode and the cathode of said fourth diode;

means for summing the output of said third and first diodes through appropriate ones of said weighting means;

means for summing the outputs of the second and fourth diodes through appropriate ones of said weighting means;

means connecting the summed output of said third and first diodes for biasing said third diode through a portion of said first divider;

means connecting the summed output of said second and fourth diodes for biasing said fourth diode through a portion of said second divider; and means for determining the difference between said summed outputs.

18. A system as defined in claim 2 including a system input terminal at which said input signal wave can be applied;

means connecting the input of said first converter to said input terminal;

said means for selectively altering comprising:

a second operational amplifier having its input connected through a first one of said weighting means to a unipolar output of said first converter and through a second one of said weighting means to said input terminal;

a feedback loop connected between the output and input of said second amplifier and having a third one and fourth one of said weighting means connected in series therein;

a third operational amplifier having a feedback loop with a resistor and capacitor in parallel therein;

means connecting the output of said second amplifier to the input of said third amplifier;

a fourth operational amplifier having its input connected to the output of said third amplifier;

rectifying means;

means connecting the output of said fourth amplifier through said rectifying means to the junction of said third and fourth weighting means; and a system output terminal connected to the output of said third amplifier.

19. A system as defined in claim 5 wherein each of said converters comprises a high gain amplifier having a pair of feedback paths, a first unidirectional current conducting means in one of said paths for permitting current flow only during positive excursions of said input wave, a second unidirectional current conducting means in the other of said path for permitting current flow only during negative excursions of said input wave, respective load impedances in each of said paths, and means for deriving a unipolar output signal from across the load impedance in at least one of said paths.

20. A system as defined in claim 19 including a system input terminal at which said input wave can be applied;

each of said converters including a summing junction at its input;

means connecting said input terminal to a first summing junction at the input of said first converter;

means connecting said input terminal through a first one of said weighting means to a second summing junction at the input of said second converter;

means connecting the output of said first converter through a second one of said weighting means to said second summing junction;

an inverter;

a summing and filtering amplifier having a third summing junction at its input;

means connecting said input terminal through a third one of said weighting means to said third summing junction;

means connecting a unipolar output of a first polarity of said first converter through a fourth one of said weighting means to said third summing junction;

means connecting a unipolar output of an opposite polarity to said first polarity from said second converter, through said inverter, and through a fifth one of said weighting means to said third summing junction; and means connecting the output of said summing and filtering amplifier through a sixth one of said weighting means to said second summing junction.

21. A system as defined in claim 19 including a system input terminal at which said input wave can be supplied;

each of said converters including a summing junction at its input;

means connecting said input terminal to a first summing junction at the input of said first converter;

means connecting said input terminal through a first one of said weighting means to a second summing junction at the input of said second converter;

means connecting a unipolar output of said first converter through a second one of said weighting means to said second summing junction;

a first summing and filtering amplifier;

means connecting the input of said first summing and filtering amplifier through a third one of said weighting means to said input terminal and through a fourth one of said weighting means to the output of said first converter;

a second summing and filtering amplifier;

means connecting the input of said second summing and filtering amplifier through a fifth one of said weighting means to a unipolar output of said second converter and through a sixth one of said weighting means to the output of said first summing and filtering amplifier; and means connecting through a seventh one of said weighting means the output of said first summing and filtering amplifier to said second summing junction.

22. A system as defined in claim 19 including a system input terminal at which said input wave can be supplied;

each of said converters including a summing junction at its input;

means connecting said input terminal to a first summing junction at the input of said first converter;

means connecting said input terminal through a first one of said weighting means to a second summing junction at the input of said second converter;

means connecting a unipolar output of said first converter through a second one of said weighting means to said second summing junction;

a first summing and filtering amplifier;

means connecting the input of said first summing and filtering amplifier through a third one of said weighting means to said input terminal and through a fourth one of said weighting means to the output of said first converter;

a second summing and filtering amplifier;

means connecting the input of said second summing and filtering amplifier through a fifth one of said weighting means to a unipolar output of said second converter, through a sixth one of said weighting means to said unipolar output of said first converter, and through a seventh one of said weighting means to said input terminal;

means connecting through an eighth one of said weighting means the output of said first summing and filtering amplifier to said second summing junction.

23. A system for converting a time-varying, complex electrical input signal to DC, and comprising in combination;

a full-wave operational rectifier means having an input summing function; and feedback means connected for applying said DC to said summing junction of said operational rectifier means so as to vary the conduction level of said rectifier means proportionally to said DC.

24. A system as defined in claim 23 wherein said operational rectifier means includes a first operational rectifier and a second operational rectifier having an input summing junction, scaling impedances connecting the input of said rectifier and the output of said first rectifier to said summing junction, and said feedback means is connected to apply said DC to said summing junction.

25. A system as defined in claim 23 which further includes filter means operatively connected for receiving said DC so as to average said DC before the latter is applied to said summing junction.

26. A system as defined in claim 24 which further includes filter means having an input operatively connected through respective scaling impedances to both the input and output of said first rectifier and the output of said second rectifier so as to average said DC before the latter is applied to said summing junction.

* * * * *

UNITED STATES PATENT OFFICE
CERTIFICATE OF CORRECTION

Patent No. 3,641,420 Dated February 8, 1972

Inventor(s) Peter L. Richman

It is certified that error appears in the above-identified patent and that said Letters Patent are hereby corrected as shown below:

Column 4, line 12, the term "of" should be --or--;

Column 4, line 21, the term "Dc" should be -- DC--;

Column 4, line 36, the term "basis" should be --basic--;

Column 5, line 44, the term "Dc" should be --DC--;

Column 9, line 74, the term "$e_1 \cos\theta_1$" should be --$2e_1 \cos\theta_1$--;

Column 10, line 28, the term "$(2e_n/n)($" should be --$2e_n/n$--;

Column 10, line 40, the term "$(1/\beta$" should be --$1/\beta$--;

Column 10, line 57, the term "$\pi,4$" should be --$\beta/4$--;

Column 10, line 73, the term "in" should be --and--;

Column 11, line 27, an open parentheses --(-- should be inserted before "i.e.";

Column 11, line 36, the Greek letter --$\alpha$-- should be inserted after "by";

UNITED STATES PATENT OFFICE

CERTIFICATE OF CORRECTION

Patent No. 3,641420 Dated February 8,1972

PAGE - 2

Inventor(s) Peter L. Richman

It is certified that error appears in the above-identified patent and that said Letters Patent are hereby corrected as shown below:

Column 11, line 67, the term "$2\ \pi e_1$" should be --$2/\pi e_1$--;

Column 14, line 40, the term "$\beta$" should be --$\alpha\beta$--;

Column 18, line 65, the term "$\frac{2en}{v} \cos n\theta_1$" should be --$\frac{2en}{n} \cos n\theta_1$--

Column 19, line 12, the term $\beta/5\pi)$" should be --$(\beta/5\pi)$--;

Column 19, line 70, the term "$e_{Avg}$" should be --$E_{Avg}$--;

Column 20, line 24, the term "$(1/5\pi az\beta)$" should be --$(1/5\pi + \beta)$--;

Column 22, line 2, the term "converging" should be --converting--.

Signed and sealed this 11th day of July 1972.

(SEAL)
Attest:

EDWARD M. FLETCHER, JR.
Attesting Officer

ROBERT GOTTSCHALK
Commissioner of Patents